United States Patent [19]

Inoue et al.

[11] Patent Number: 4,776,676

[45] Date of Patent: Oct. 11, 1988

[54] FERROELECTRIC LIQUID CRYSTAL OPTICAL MODULATION DEVICE PROVIDING GRADATION BY VOLTAGE GRADIENT ON RESISTIVE ELECTRODE

[75] Inventors: Hiroshi Inoue, Yokohama; Masaki Kuribayashi, Inagi, both of Japan

[73] Assignee: Canon Kabushiki Kaisha, Tokyo, Japan

[21] Appl. No.: 88,613

[22] Filed: Aug. 24, 1987

[30] Foreign Application Priority Data

Aug. 25, 1986 [JP] Japan .............................. 61-198409
Aug. 6, 1987 [JP] Japan .............................. 61-197826

[51] Int. Cl.$^4$ .................................................. G02F 1/13
[52] U.S. Cl. ........................... 350/350 S; 350/333;
350/336; 340/765; 340/784
[58] Field of Search .................... 350/333, 336, 350 S;
340/765, 784

[56] References Cited

U.S. PATENT DOCUMENTS

| | | | |
|---|---|---|---|
| 4,139,278 | 2/1979 | Matsumoto et al. | 350/336 X |
| 4,193,669 | 3/1980 | Richardson | 350/336 X |
| 4,392,718 | 7/1983 | Morrison | 350/336 |
| 4,516,835 | 5/1985 | Suzuki et al. | 350/336 |
| 4,548,476 | 10/1985 | Kaneko | 350/350 S |
| 4,617,646 | 10/1986 | Yang | 350/350 S X |
| 4,655,561 | 4/1987 | Kanbe et al. | 350/350 S |
| 4,712,877 | 12/1987 | Okada et al. | 350/350 S |

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

An optical modulation device suited for gradational display, includes a first conductor film electrically connected to a first electrode and a second electrode, and a second conductor film disposed opposite to the first conductor film, an optical modulation material disposed between the first and second conductor films; and driving means for (a) setting the first electrode at a first reference potential and supplying the second electrode with a first voltage of one polarity relative to the first reference potential to furnish the first conductor film with a first potential gradient; (b) supplying the second conductor film with a first voltage of the other polarity relative to the first reference potential in phase with the first voltage of one polarity; (c) setting the second electrode at a second reference potential and supplying the first electrode with a second voltage of the other polarity relative to the second reference potential to furnish the first conductor film with a second potential gradient; (d) supplying the second conductor film with a second voltage of one polarity relative to the second reference potential in phase with the second voltage of the other polarity; and (e) setting the second voltage of one (or the other) polarity to satisfy a compliment relationship with the first voltage of the other (or one) polarity.

47 Claims, 22 Drawing Sheets

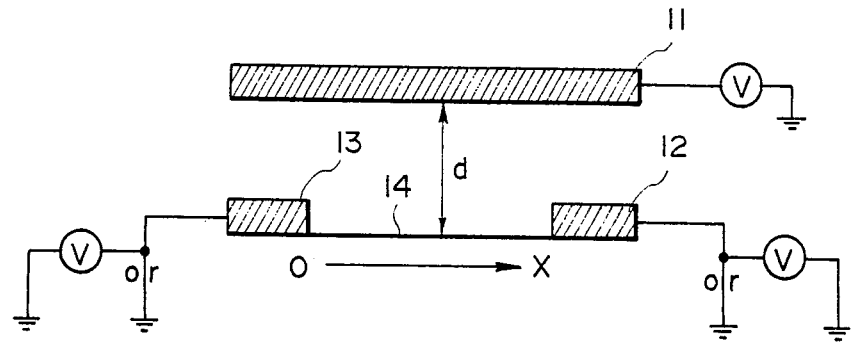
FIG. IA
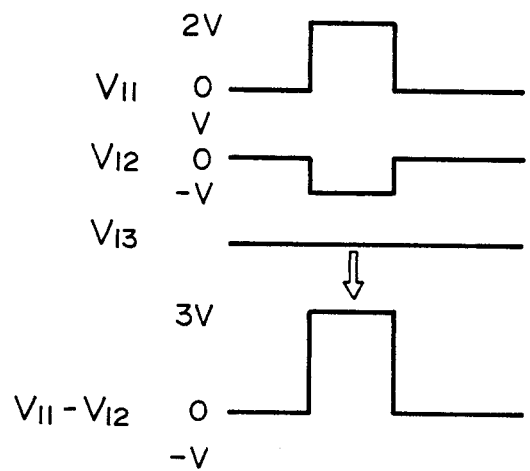
FIG. IB

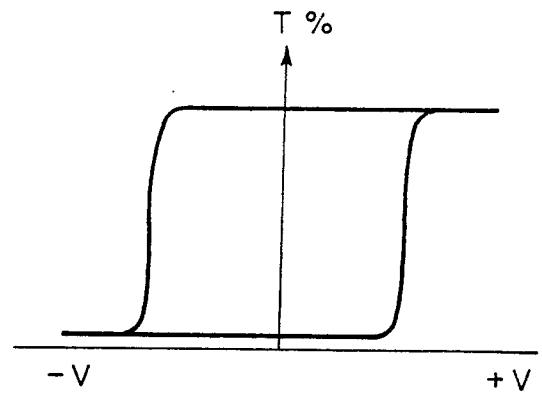
F I G. 2
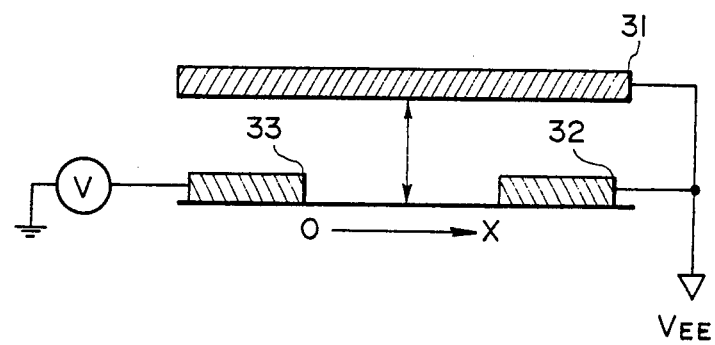
F I G. 3A

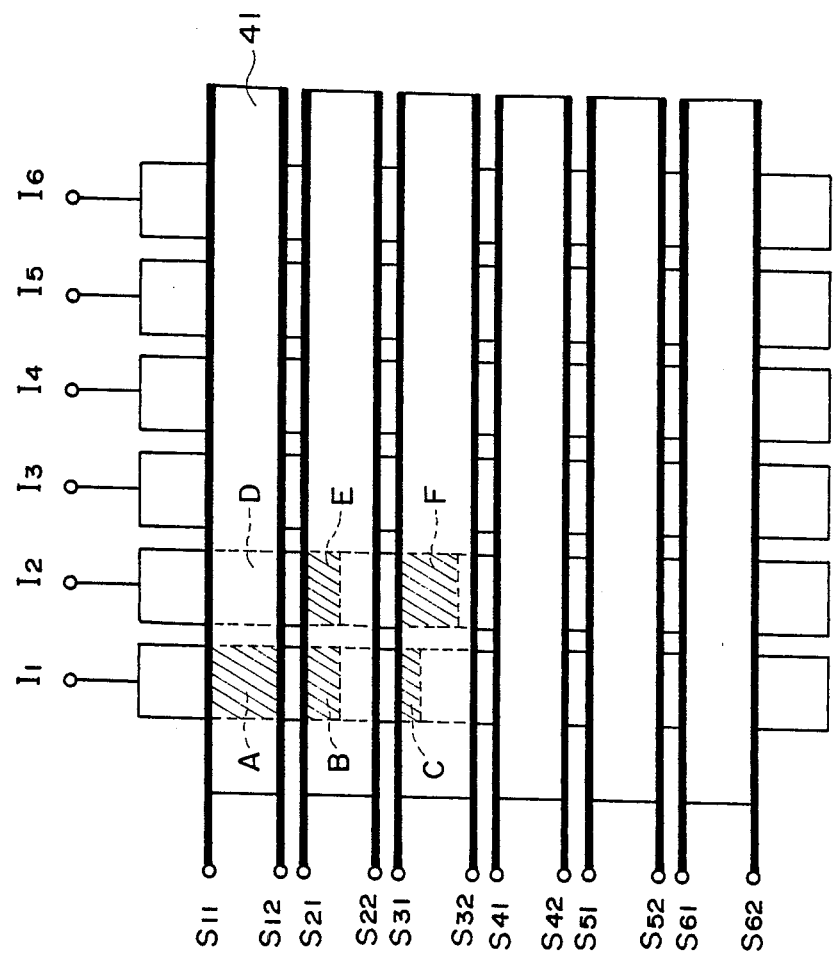

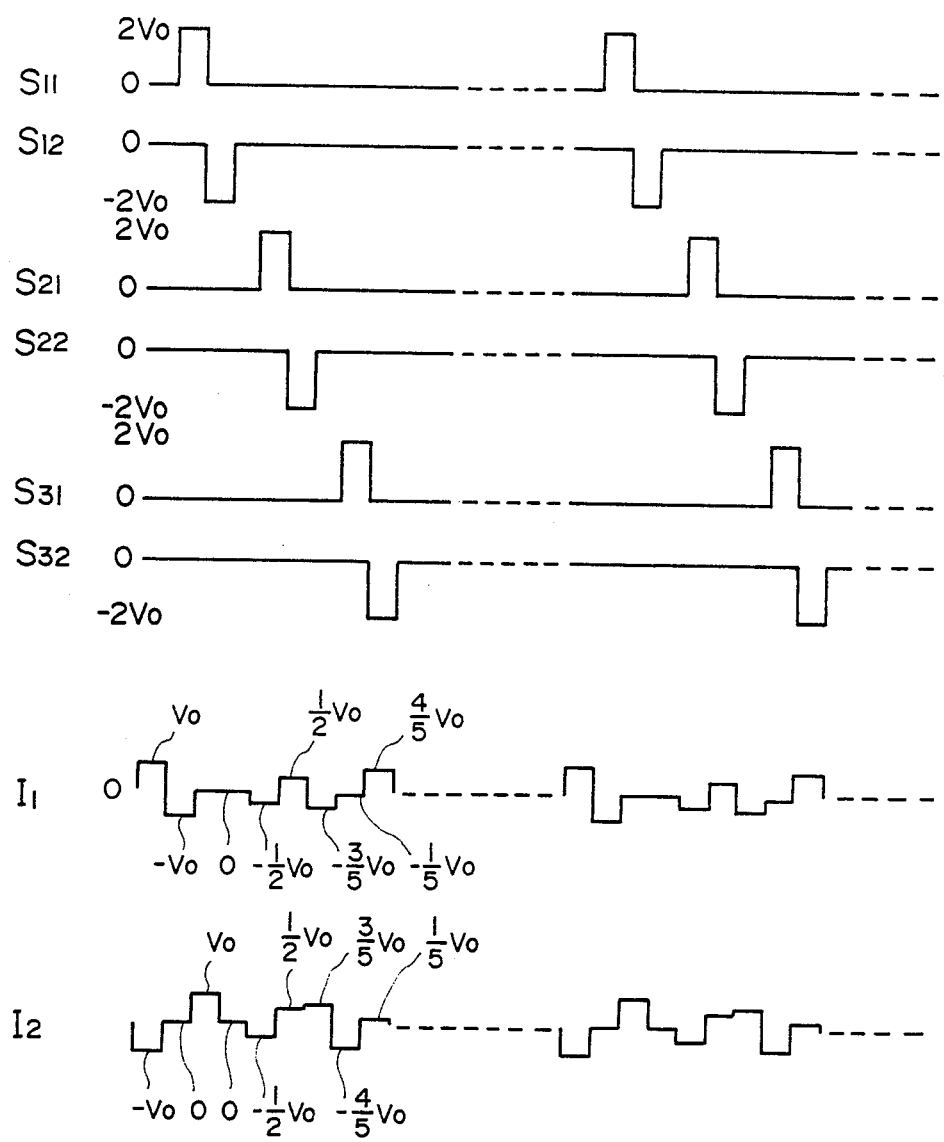
F I G. 10

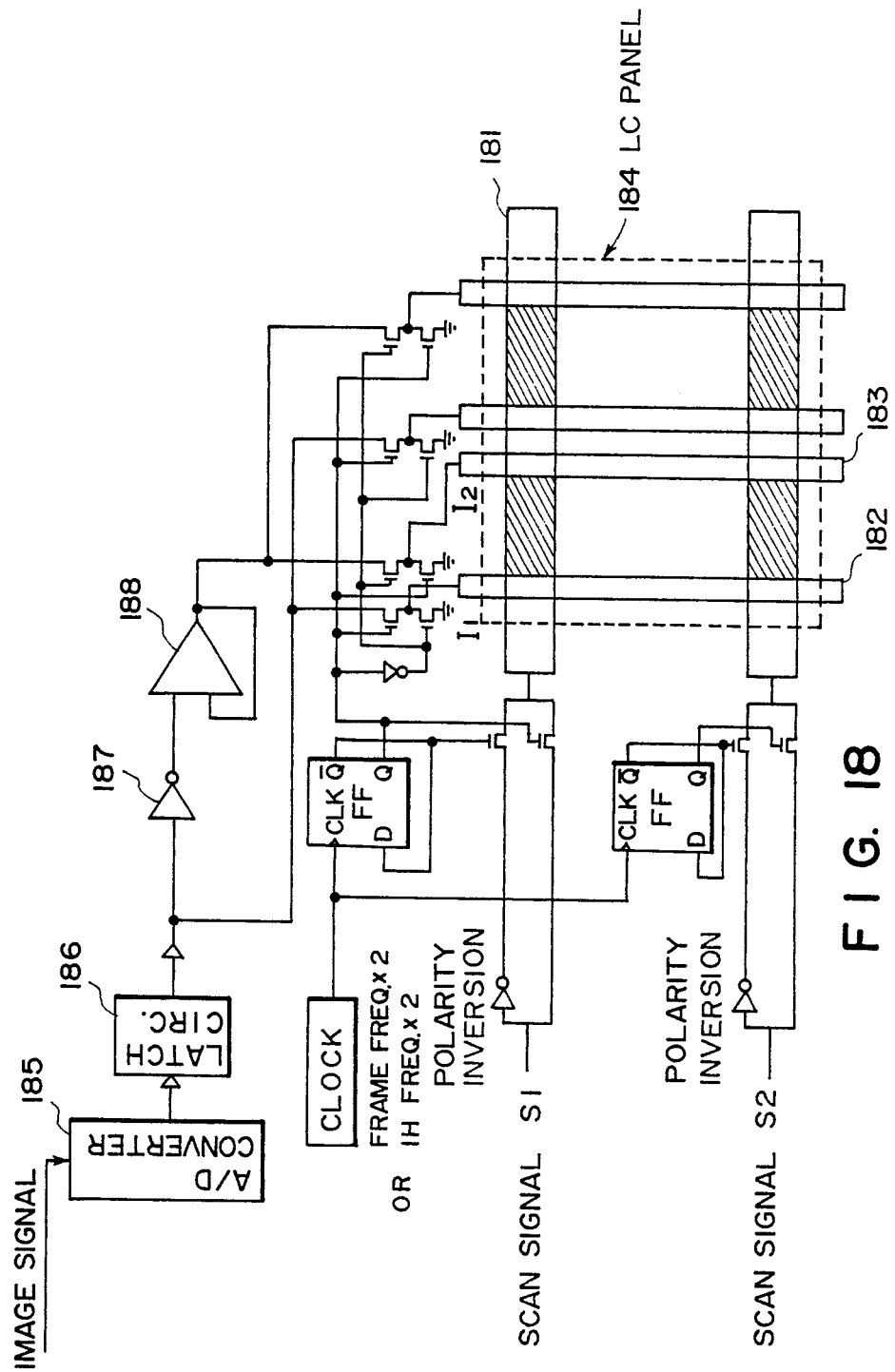
F I G. 18

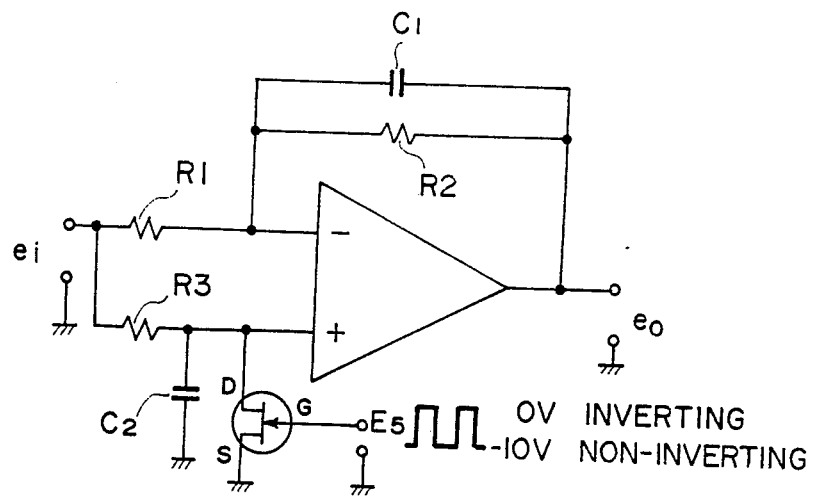
F I G. 20A
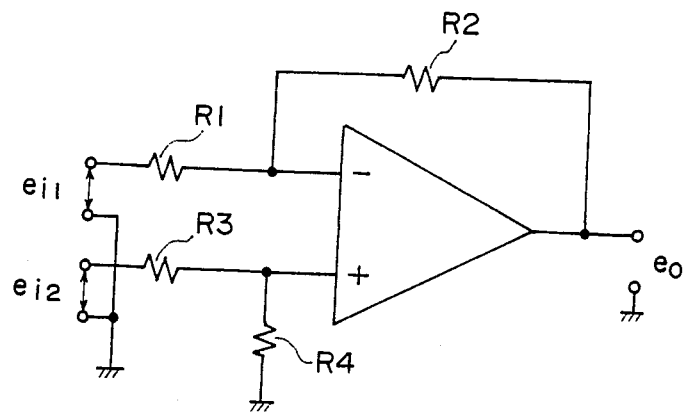
F I G. 20B

FERROELECTRIC LIQUID CRYSTAL OPTICAL MODULATION DEVICE PROVIDING GRADATION BY VOLTAGE GRADIENT ON RESISTIVE ELECTRODE

FIELD OF THE INVENTION AND RELATED ART

The present invention relates to an optical modulation device suited for gradational display, particularly an optical modulation device for gradational display using a ferroelectric liquid crystal.

In the conventional liquid crystal television panel of the active matrix driving system, thin film transistors (TFTs) are arranged in matrix corresponding to respective pixels. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of pixels.

However, such a television display panel of the active matrix driving system using a TN liquid crystal uses a complicated structure of TFTs requiring a large number of production steps and is accompanied with the drawback of high production cost. Moreover, there is a further problem that it is difficult to provide a large area semiconductor film (e.g., of polysilicon, amorphous silicon) constituting TFTs.

Further, a display panel of a passive matrix driving type using a TN liquid crystal has been known as one having a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby crosstalk occurs and a picture with high contrast cannot be obtained. Furthermore, as the duty factor is decreased, it is difficult to control gradation of respective pixels by means of voltage modulation so that this type of display is not adapted for a display panel of a high pixel or wiring density, particularly one for a liquid crystal television panel.

On the other hand, U.S. Pat. No. 4,655,561, JP-A 62-119521 and JP-A 62-125330 disclose a gradational system wherein a pixel of ferroelectric liquid crystal is reset by application of a reset pulse and then supplied with a gradational signal to control the areal ratio of the dark part and the bright part of the pixel. Further, JP-A 61-69036 discloses a gradational system wherein a time ratio is controlled between a period of applying a signal for providing a bright state and a period of applying a signal for providing a dark state.

SUMMARY OF THE INVENTION

A principal object of the present invention is to provide a gradational display system for a display panel using an optical modulation material capable of providing a discriminable contrast depending on an electric field applied thereto, particularly a ferroelectric liquid crystal.

According to the present invention, there is provided an optical modulation device comprising:

a first conductor film electrically connected to first voltage-application means and second voltage application means, and a second conductor film disposed opposite to the first conductor film;

an optical modulation material disposed between the first and second conductor films; and driving means for: (a) setting the first voltage-application means at a first reference potential and supplying the second voltage-application means with a first voltage of one polarity relative to the first reference potential to furnish the first conductor film with a first potential gradient; (b) supplying the second conductor film with a first voltage of the other polarity relative to the first reference potential in phase with the first voltage of one polarity; (c) setting the second voltage application means at a second reference potential and supplying the first voltage-application means with a second voltage of the other polarity relative to the second reference potential to furnish the first conductor film with a second potential gradient; (d) supplying the second conductor film with a second voltage of one polarity relative to the second reference potential in phase with the second voltage of the other polarity; and (e) setting the second voltage of one polarity to satisfy a compliment relationship with the first voltage of the other polarity or for setting the second voltage of the other polarity to satisfy a compliment relationship with the first voltage of one polarity.

These and other objects, features and advantages of the present invention will become more apparent upon a consideration of the following description of the preferred embodiments of the present invention taken in conjunction with the accompanying drawings.

DESCRIPTION OF THE DRAWINGS

FIG. 2 is a characteristic diagram showing a hysteretic curve of V (voltage)/T (transmittance) of a ferroelectric liquid crystal device;

FIG. 4 is a plan view of a matrix electrode arrangement used in the present invention;

FIGS. 5–10 are respectively time charts showing an exemplary set of driving waveforms used for driving a display panel having the matrix electrode arrangement shown in FIG. 4;

FIG. 18 is a circuit diagram of a driving circuit used in the present invention;

FIG. 20A is a circuit diagram of an inverting amplifier; FIG. 20B is a circuit diagram of an analog subtracter.

DESCRIPTION OF THE PREFERRED EMBODIMENTS

Figure 3B:
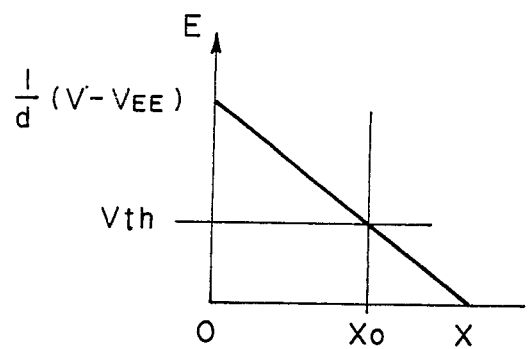
FIG. 3A shows an electrode arrangement of a ferroelectric liquid crystal device outside the scope of the present invention, FIG. 3B schematically shows a potential gradient developed in a pixel of the device.
FIG. 3C is a schematic plan view of the pixel.

FIG. 3A schematically shows a sectional view of a pixel of an optical modulation device comprising a scanning electrode 31, signal electrodes 32 and 33 between which a pixel having an effective display span O-X is defined, and a cell gap d formed between the electrodes and filled with a ferroelectric liquid crystal showing bistability in response to an applied electric field. Along the span O-X, a potential gradient as shown in FIG. 3B is developed.

Herein, it is assumed that $V_{th}$ denotes a critical electric field (threshold voltage) for causing transition between optically stable states of the optical modulation device, and $X_0$ denotes a position along the O-X span at which the potential gradient curve X-E intersects with the threshold voltage $V_{th}$ level. Then, the span $X_0$-X represent a portion where the electric field E is below the threshold voltage $V_{th}$, so that a state inversion (e.g., inversion from "white" state to "black" display state) is caused along the span O-$X_0$ while such state inversion is not caused along the span $X_0$-X.

Figure 3C:
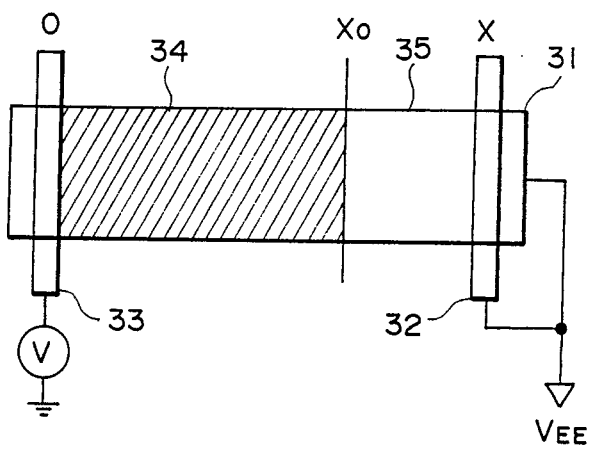

The resultant state is illustrated by FIG. 3C wherein a hatched region 34 represents the inverted state portion and a nonhatched region 35 represents the non-inverted state portion.

Incidentally, a ferroelectric liquid crystal device shows a hysteresis in a T-V curve as shown in FIG. 2. As a result, the inverted state region 34 is not subjected to further inversion in a reverse direction by simply lowering the external electric field. In other words, even if the external voltage is lowered to shift the position $X_0$ at which the intersection with the threshold voltage level $V_{th}$ occurs toward the position O, the area of the inverted state portion 34 cannot be controlled (decreased). On the other hand, when the external voltage is increased toward a higher voltage side, the position $X_0$ is shifted to the X side and the area of the inverted state portion 34 can be increased correspondingly.

According to the present invention, as described above, a gradational display may be realized through a first step wherein "white" (or "black") is written by application of a voltage of one polarity under a potential gradient and a second step wherein a voltage which is a compliment of the voltage of one polarity for writing "black" (or "white") is applied under a potential gradient.

FIG. 1A is a schematic sectional view showing an electrode arrangement forming a pixel in a ferroelectric liquid crystal device used in the present invention, which comprises a scanning electrode 11, signal electrodes 12 and 13 between which a pixel having an effective display span O-X is formed along a high-resistivity conductor film 14, and a cell gap d filled with a ferroelectric liquid crystal showing bistability in response to an applied electric field. A potential gradient varying depending on a waveform and a position may be developed along the span O-X.

Figure 1C:
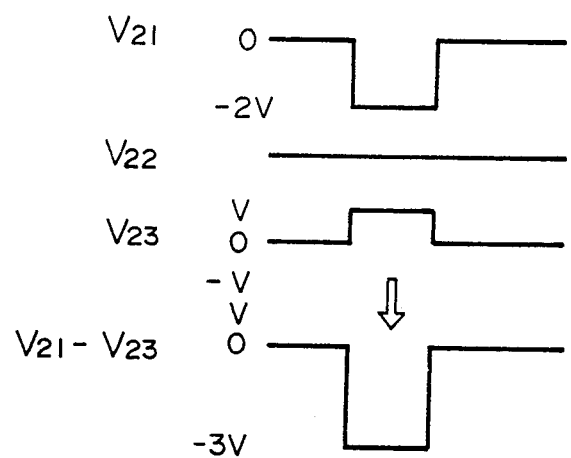
FIGS. 1B and 1C show driving waveforms used in the present invention, FIG. 1D schematically shows a potential gradient developed in a pixel at the time of driving.
Figure 1D:
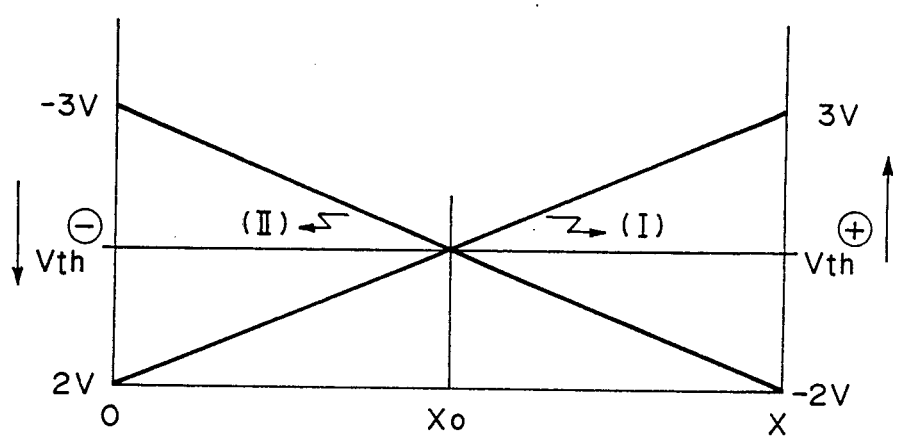
FIG. 1A is a schematic sectional view across the thickness of a ferroelectric liquid crystal device used in the present invention.

FIG. 1B shows a scanning signal waveform $V_{11}$ applied to the scanning electrode 11, an information signal waveform $V_{12}$ applied to the signal electrode 12, and a waveform $V_{13}$ for grounding the signal electrode 13. At this time, a voltage as shown by a waveform $V_{11}$-$V_{12}$ in FIG. 1B is applied between the scanning electrode 11 and the signal electrode 12, whereby a potential gradient represented by a right side line (I) in FIG. 1D is developed along the span O-X. Further, FIG. 1C shows a scanning signal waveform $V_{21}$ applied to the scanning electrode 11, a waveform $V_{22}$ for grounding the signal electrode 12, an information signal waveform $V_{23}$ applied to the signal electrode 13, and a voltage waveform $V_{21}$-$V_{23}$ applied accordingly between the scanning electrode 11 and the signal electrode 13. As a result, a potential gradient represented by a left side line (II) in FIG. 1D is developed along the span O-X.

In the graph shown in FIG. 1D, the threshold voltage when the external voltage is on the higher voltage side (i.e., the scanning electrode is higher than the signal electrode in this embodiment) is denoted by $V_{th}\oplus$, the threshold voltage when the external voltage is on the lower voltage side is denoted by $V_{th}\ominus$, and when $|V_{th}\oplus|=|V_{th}\ominus|$ is satisfied, the absolute values of the potentials at the position $X_0$ and the same for both of the lines (I) and (II) at the mid point of the span O-X. In actual cases, however, these threshold voltages are somewhat different from each other and the V-T (%) hysteresis curve shown in FIG. 2 is not symmetrical. Therefore, in actual cases, a correction for linearizing the V-T (%) hysteresis curve, a correction of the gain of an inverting amplifier, etc., may be effected. However, this embodiment is explained based on the case of $|V_{th}\oplus|=|V_{th}\ominus|$.

The compliment relationship with respect to voltage used herein has the following meaning. That is, with respect to a certain voltage signal (e.g., a gradation signal voltage $V_{12}$ shown in FIG. 1B) having a maximum value $V_{max}$ (i.e., a voltage for providing the entirety of the effective display pixel span O-X with a "white" (or "black") display state), another voltage (e.g., a signal voltage $V_{23}$ shown in FIG. 1C) assumes a value $(-(V_{max}-V_{12}))$ obtained by polarity inversion of the difference between the maximum value and the certain voltage ($V_{max}$-$V_{12}$) More specifically, in the present invention, the application voltage $V_{12}$ can change the peak value, pulse duration or number of pulses depending on given gradation data. Corresponding to the change, the application voltage $V_{23}$ having the compliment relationship with respect to the voltage $V_{12}$ also changes its peak value, pulse duration and number of pulses.

Referring again to FIGS. 1A-1D, in a first frame operation, when the input signal $V_{12}$ is increased, the voltage at the position X becomes larger than 3 V and the intersection $X_0$ with $V_{th}\oplus$ is shifted toward the O side. As a result, the transmittance of the pixel is changed so that the "white" display region is enlarged. Further, when the previous writing operation has provided the X-$X_0$ region of "white" display state, even if the input signal voltage $V_{12}$ becomes smaller, the white X-$X_0$ region is not changed at all because of the memory effect or hysteretic effect of the ferroelectric liquid crystal.

In the present invention, in the subsequent frame operation, the polarity of voltages for writing into pixels is inverted with application of input signals satisfying the compliment relationship as described. As a result, the white region and the black region are caused to have a prescribed a real ratio.

Then, a driving embodiment of the present invention will be explained.

FIG. 4 is a plan view of a matrix electrode arrangement used in the present invention which comprises a number (n) of high-resistivity conductor films 41 in the form of stripes, scanning electrodes $S_{11}$, $S_{12}$, $S_{21}$, $S_{22}$, . . .

. $S_{n1}$ and $S_{n2}$ and a number (m) of signal electrodes $I_1$, $I_2$, ... $I_m$, so as to form effective display pixels A-E ... wherein a hatched portion represents a "black" display region and a nonhatched portion represents a "white" display region. Further, a ferroelectric liquid crystal is disposed between the conductor films and the signal electrodes.

In the present invention, the high-resistivity conductor films 41 may be composed of, e.g., ITO films and $SnO_2$ films having a sheet resistivity of $10^2$–$10^6$ $\Omega/\square$, and the signal electrodes $I_1$–$I_6$ may be composed of, e.g., ITO film having a sheet resistivity of 1–$10^2$ $\Omega/\square$. Further, the scanning electrodes may be composed of low-resistivity metal or alloy, such as silver, copper, aluminum, chromium, molybdenum, or stainless steel.

Figure 5:
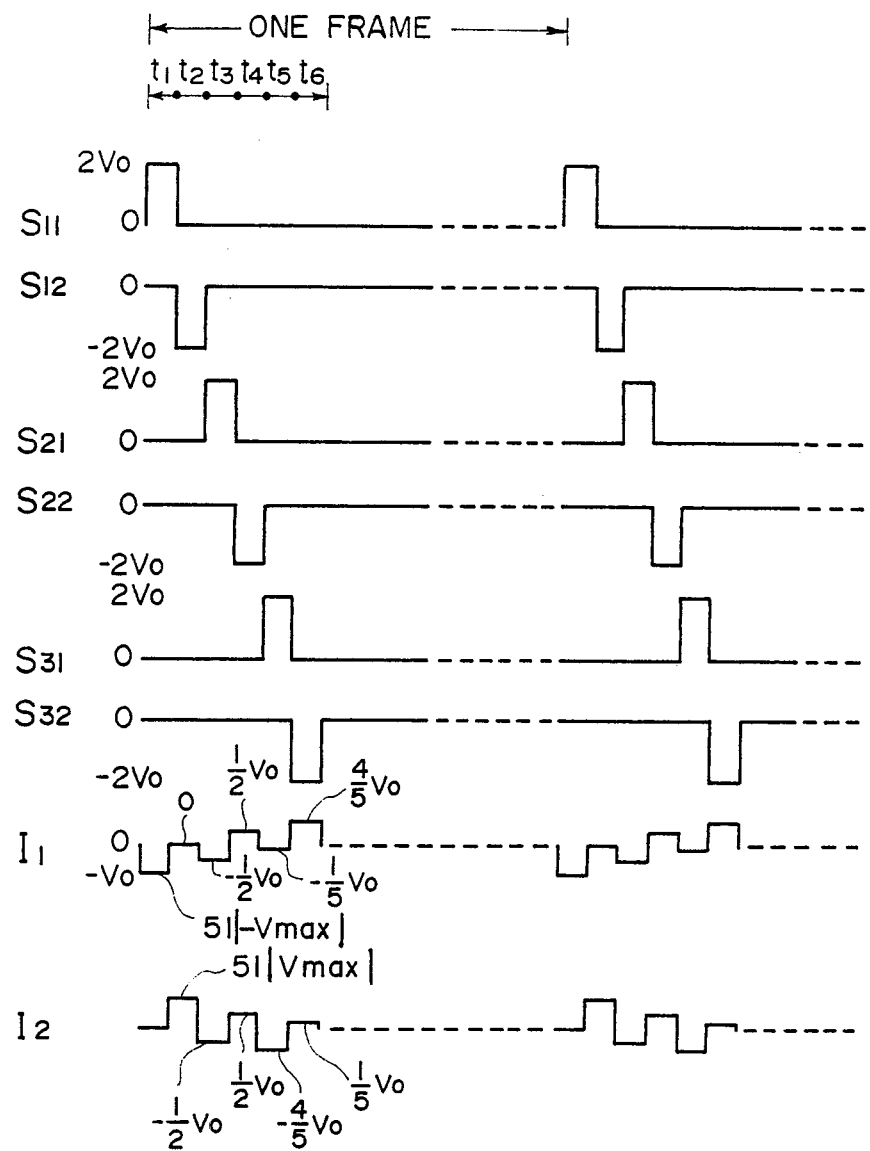

FIG. 5 shows an exemplary set of driving waveforms corresponding to the display states of the pixels A-E in FIG. 4. With respect to the pixel A, at phase $t_1$, a voltage of 2 $V_0$ is applied to the scanning electrode $S_{11}$ and a voltage of 0 is applied to the scanning electrode $S_{12}$ so that a potential gradient is developed across the conductor film 41. At this time, the signal electrode $I_1$ is supplied with a voltage of $-V_0$ which is the maximum voltage of the gradation signal, whereby the pixel A is supplied with a voltage of one polarity exceeding a first threshold voltage of the ferroelectric liquid crystal (assumed to provide a "black" display state) over the entire effective display region thereof to form a "black" display state. At the subsequent phase $t_2$, the scanning electrode $S_{11}$ is supplied with a voltage of 0 and the scanning electrode $S_{12}$ is supplied with a voltage of 2 $V_0$, whereby a potential gradient is developed along the conductor film 41. In phase with the potential gradient, the signal electrode $I_1$ is supplied with a voltage of 0 which satisfies the compliment relationship with the voltage of $-V_0$ applied at the preceding phase $t_1$. As a result, the pixel A is supplied with a voltage below the threshold voltage of the ferroelectric liquid crystal over the entire effective display region to retain the black display state formed in the previous phase as shown in FIG. 4.

With respect to the pixel B, at phase $t_3$, the same potential gradient as the one developed in the above-explained phase $t_1$ is developed across a conductor film 41 between the scanning electrodes $S_{21}$ and $S_{22}$, and in phase with the potential gradient, the signal electrode $I_1$ is supplied with a voltage of $-\frac{1}{2}\cdot V_0$, whereby one half from one end of the effective display pixel region is supplied with a voltage of one polarity exceeding the first threshold voltage of the ferroelectric liquid crystal to be written into "black". Then, at the subsequent phase $t_4$, the conductor film concerned with the pixel B is provided with the same potential gradient as the one developed in the above explained phase $t_2$, and in phase with the potential gradient, the signal electrode $I_1$ is supplied with a voltage of $\frac{1}{2}\cdot V_0$ which satisfies the compliment relationship with the voltage of $-\frac{1}{2}\cdot V_0$ applied at the phase $t_3$, whereby one half from the other end of the effective display pixel region is supplied with a voltage of the other polarity exceeding the second threshold voltage of the ferroelectric liquid crystal (assumed to provide a "white" display state) to provide a display state at the pixel B as shown in FIG. 4.

Further, with respect to the pixel C, at phase $t_5$, in phase with the potential gradient developed as described above across a conductor film 41 between the scanning electrodes $S_{31}$ and $S_{32}$, the signal electrode $I_1$ is supplied with a voltage of $-1/5\cdot V_0$, whereby one fifth from one end of the effective pixel region is supplied with a voltage exceeding the first threshold voltage. Then, at the subsequent phase $t_6$, in phase with the potential gradient as described with respect to phases $t_2$ and $t_4$, the signal electrode $I_1$ is supplied with a voltage of $4/5\cdot V_0$ which satisfies the compliment relationship with the voltage of $-1/5\cdot V_0$ applied at the phase $t_5$, whereby 4/5 of the effective pixel region is supplied with a voltage of the other polarity exceeding the second threshold voltage of the ferroelectric liquid crystal to provide a display state at the pixel C shown in FIG. 4.

The pixels D, E and F are provided with display states as shown in FIG. 4 in a similar manner as described above by using a signal electrode $I_2$.

Figure 6:
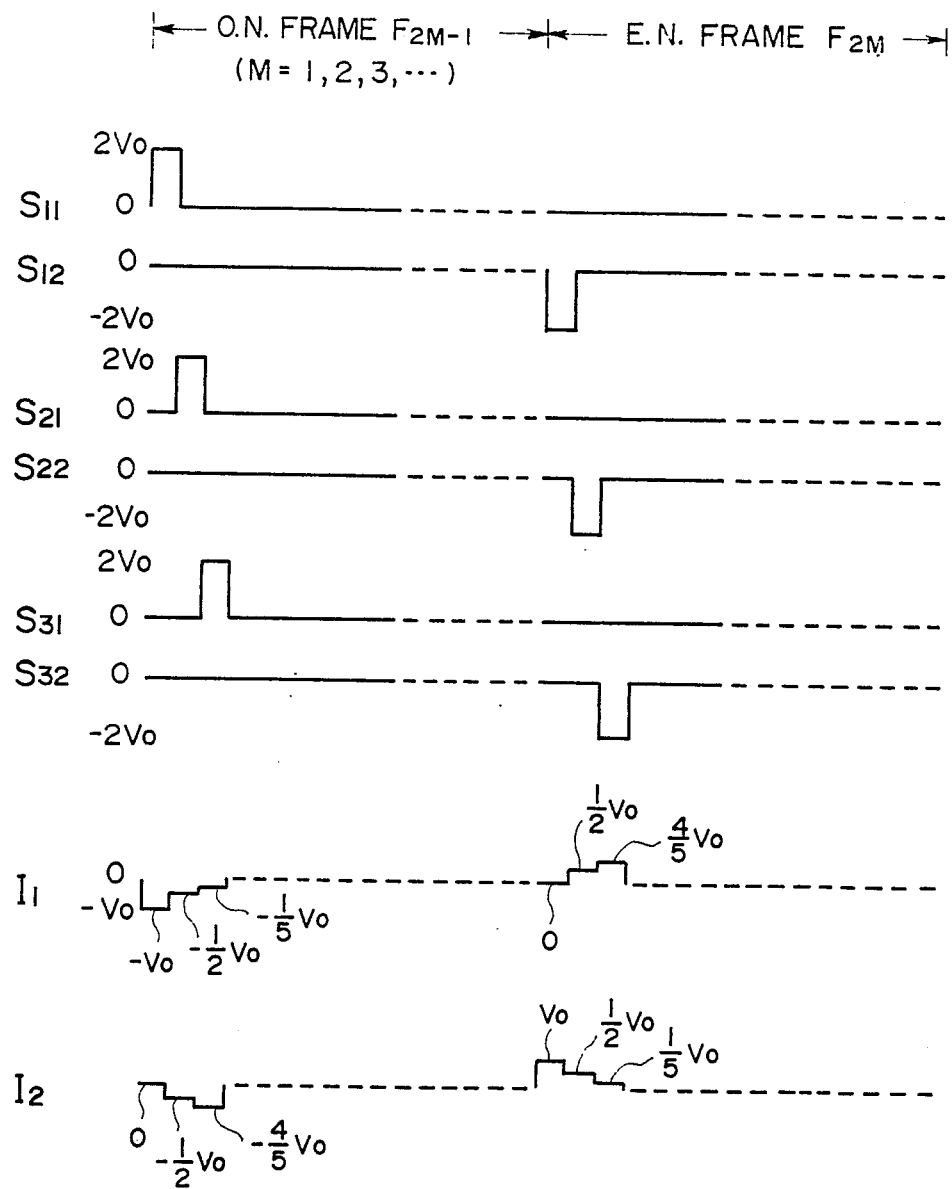

FIG. 6 shows another exemplary set of driving waveforms for use in a modification of the above-described embodiment, wherein in an odd-numbered frame $F_{2M-1}$ (M=1, 2, 3 ... ), a black display region is formed from one end of an effective pixel region, and in a subsequent even-numbered frame, a white display region is formed from the other end of the effective pixel region to form a display state as shown in FIG. 4.

Figure 7:
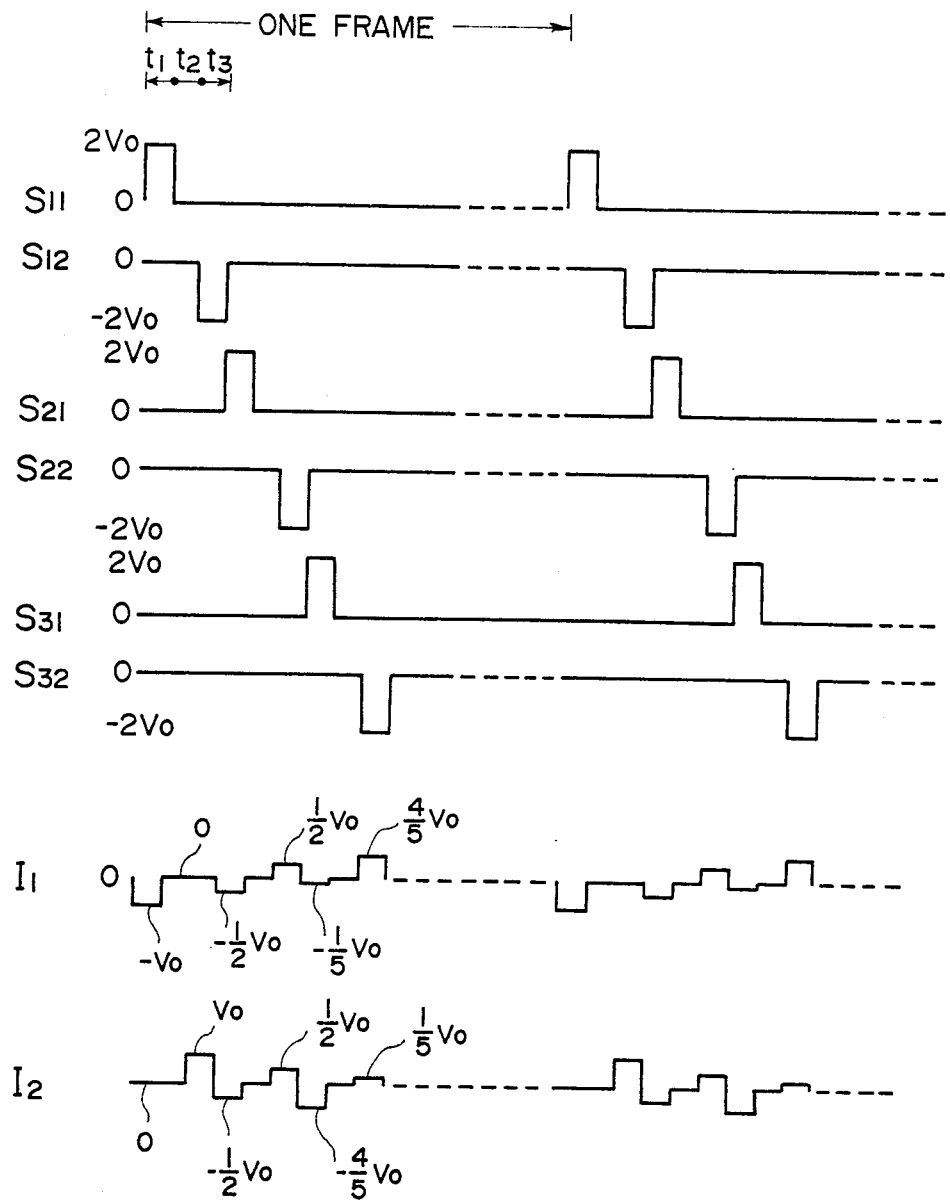

FIG. 7 shows another set of driving waveforms used in another preferred embodiment of the present invention, wherein a rest period $t_2$ for applying a voltage of 0 (at the same level as the voltage level of a nonselected scanning electrode) is interposed between the phase $t_1$ for forming a black region from one end of an effective pixel region and the phase $t_3$ for forming a white region from the other end of the effective pixel region for each line.

Figure 8:
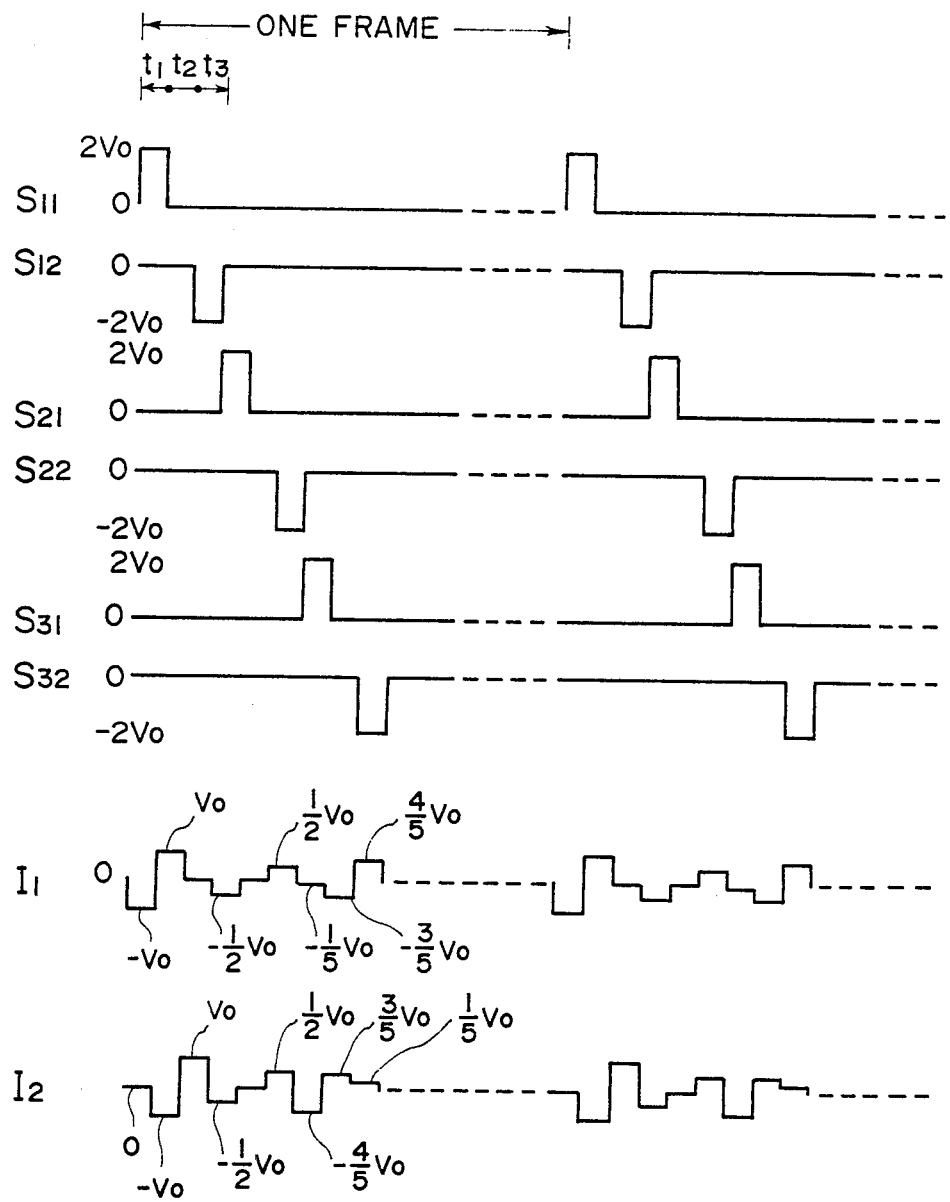

FIG. 8 shows a further preferred modification of the embodiment shown in FIG. 7, wherein in the above mentioned rest period $t_2$, a voltage signal for cancelling or removing DC components of voltage signals applied at the phases $t_1$ and $t_3$ is applied from the signal electrode side.

Figure 9:
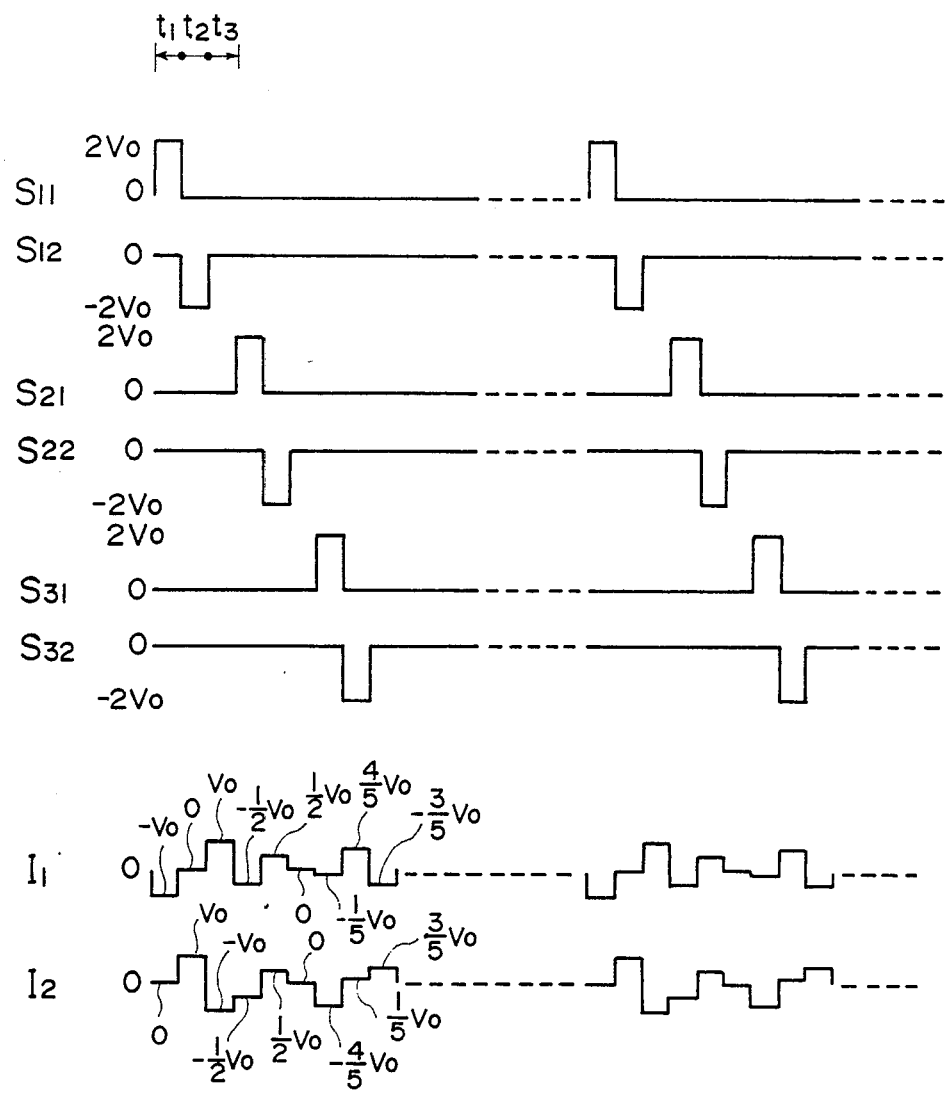

FIG. 9 shows a set of driving waveforms for use in an embodiment wherein a phase $t_3$ for applying a voltage signal for cancelling DC components is disposed after a phase $t_1$ for writing "black" from one end of an effective pixel region and a phase $t_2$ for writing "white" from the other end of the effective pixel region.

FIG. 10 shows another preferred embodiment wherein a phase $t_1$ for applying such a voltage signal for cancelling DC components is disposed prior to phases $t_2$ and $t_3$ for writing "black" and "white", respectively.

Figure 11:
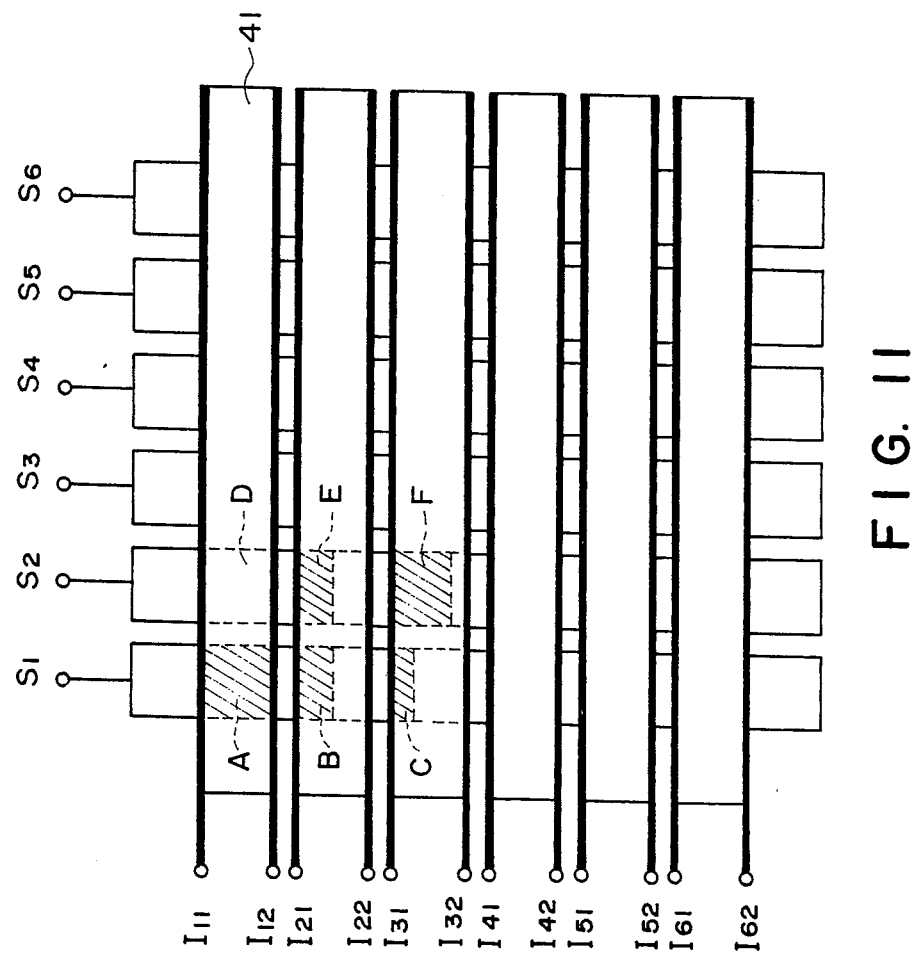
FIG. 11 is a plan view of another matrix electrode arrangement used in the present invention.
Figure 12:
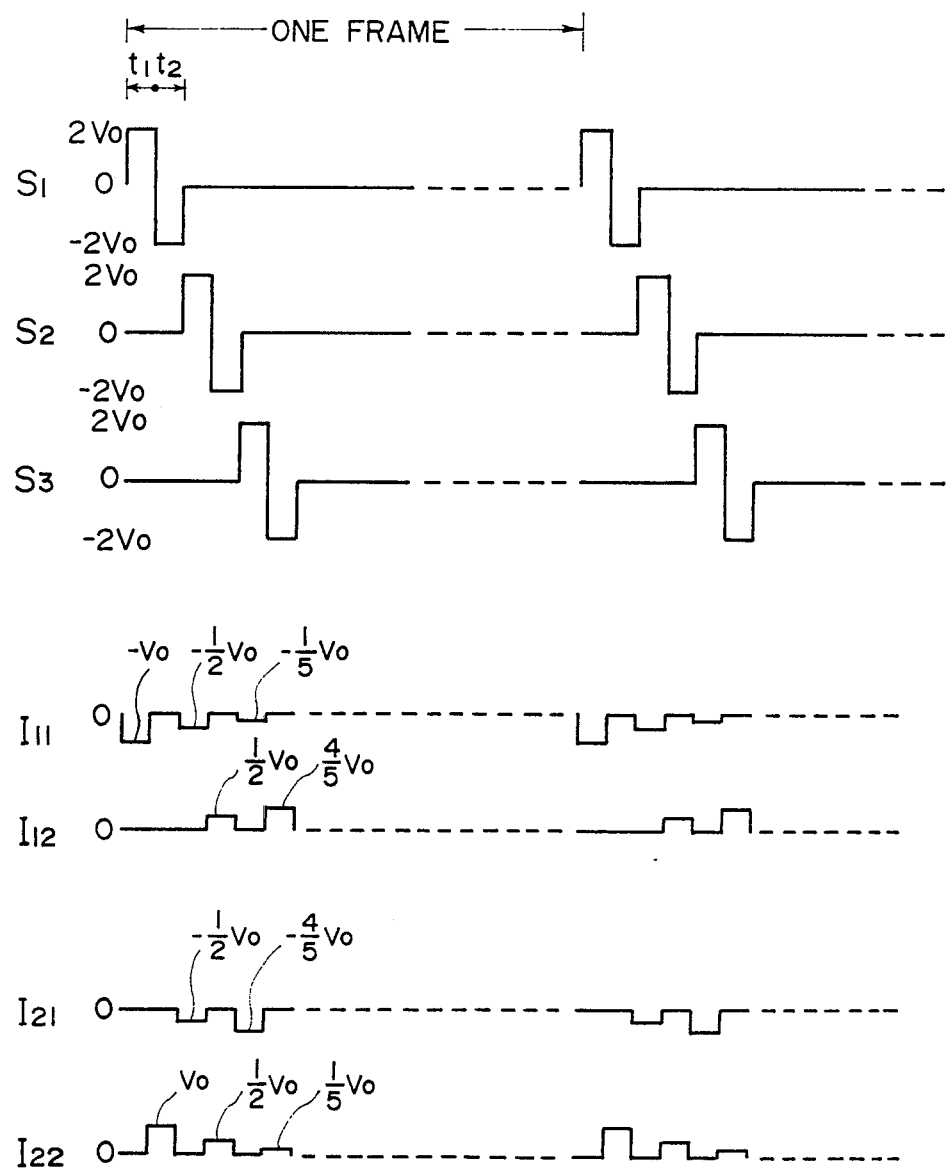
FIGS. 12–17 are respectively time charts showing an exemplary set of driving waveforms used for driving a display panel having the matrix electrode arrangement shown in FIG. 11.

FIG. 11 is a plan view of another matrix electrode arrangement used in the present invention, which comprises a number (n) of scanning electrodes $S_1$, $S_2$, ... $S_n$; a number (m) of high-resistivity conductor film stripes 41; and signal electrodes $I_{11}$, $I_{12}$, ... $I_{m1}$, $I_{m2}$, each pair among which is disposed to sandwich a conductor stripe 41. FIG. 12 shows a set of driving waveforms for providing a display state as shown in FIG. 11. Referring to FIG. 12, $S_1$–$S_3$ denote scanning signals applied to the corresponding scanning electrodes $S_1$–$S_3$ shown in FIG. 11, including a scanning selection signal comprising alternating voltages of +2 $V_0$ and −2 $V_0$. At phase $t_1$, a "black" region is formed from one end (one signal electrode side) of an effective pixel region, and at phase $t_2$, a "white" region is formed from the other end (the other signal electrode side) of the effective pixel region, whereby each effective pixel region is caused to have a controlled ratio of "white" and "black" regions.

Figure 13:
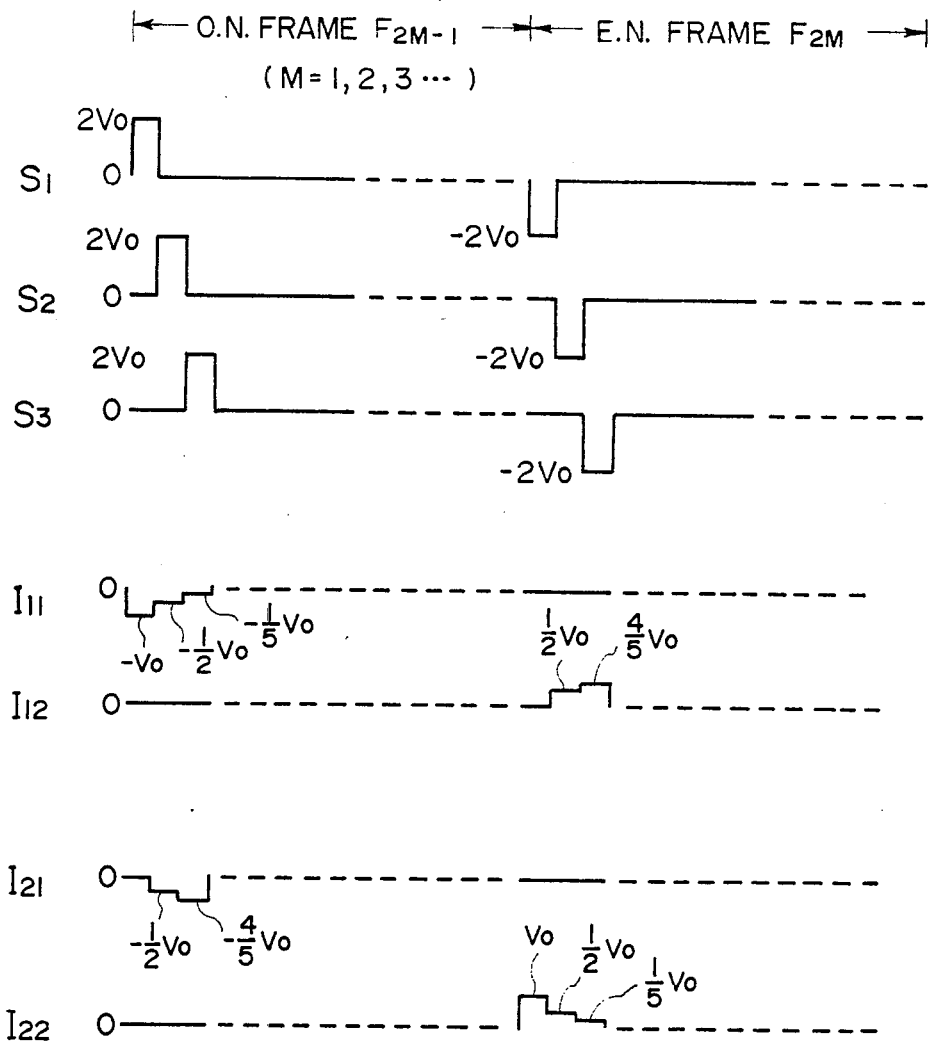

FIG. 13 shows a modification of the above embodiment shown in FIG. 12, wherein in an odd-numbered frame $F_{2M-1}$ (M=1, 2, 3 . . . ), a black region is formed from one end of an effective pixel region, and in an even-numbered frame $F_{2M}$, a white region is formed from the other end of the effective pixel region.

Figure 14:
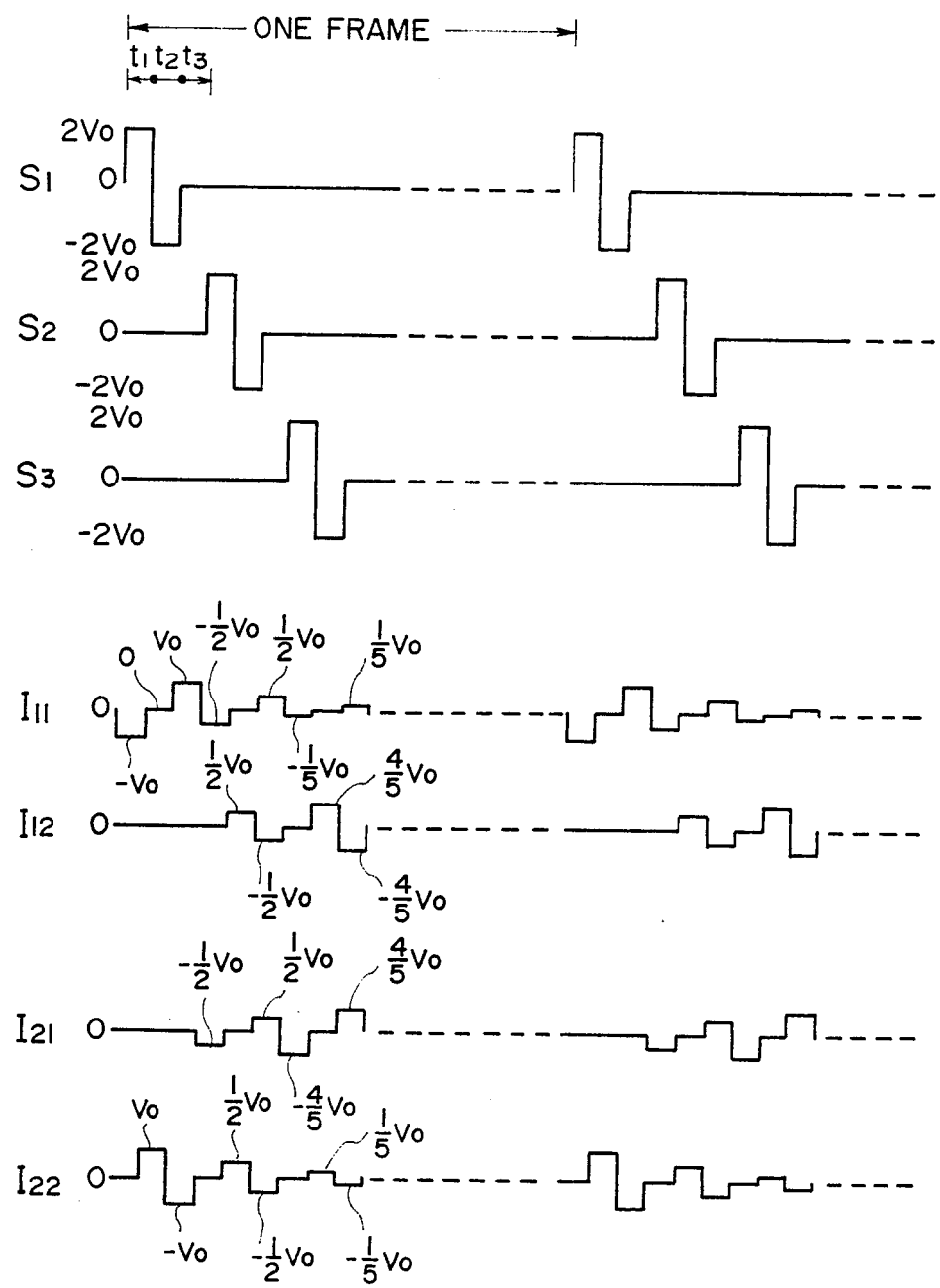
Figure 16:
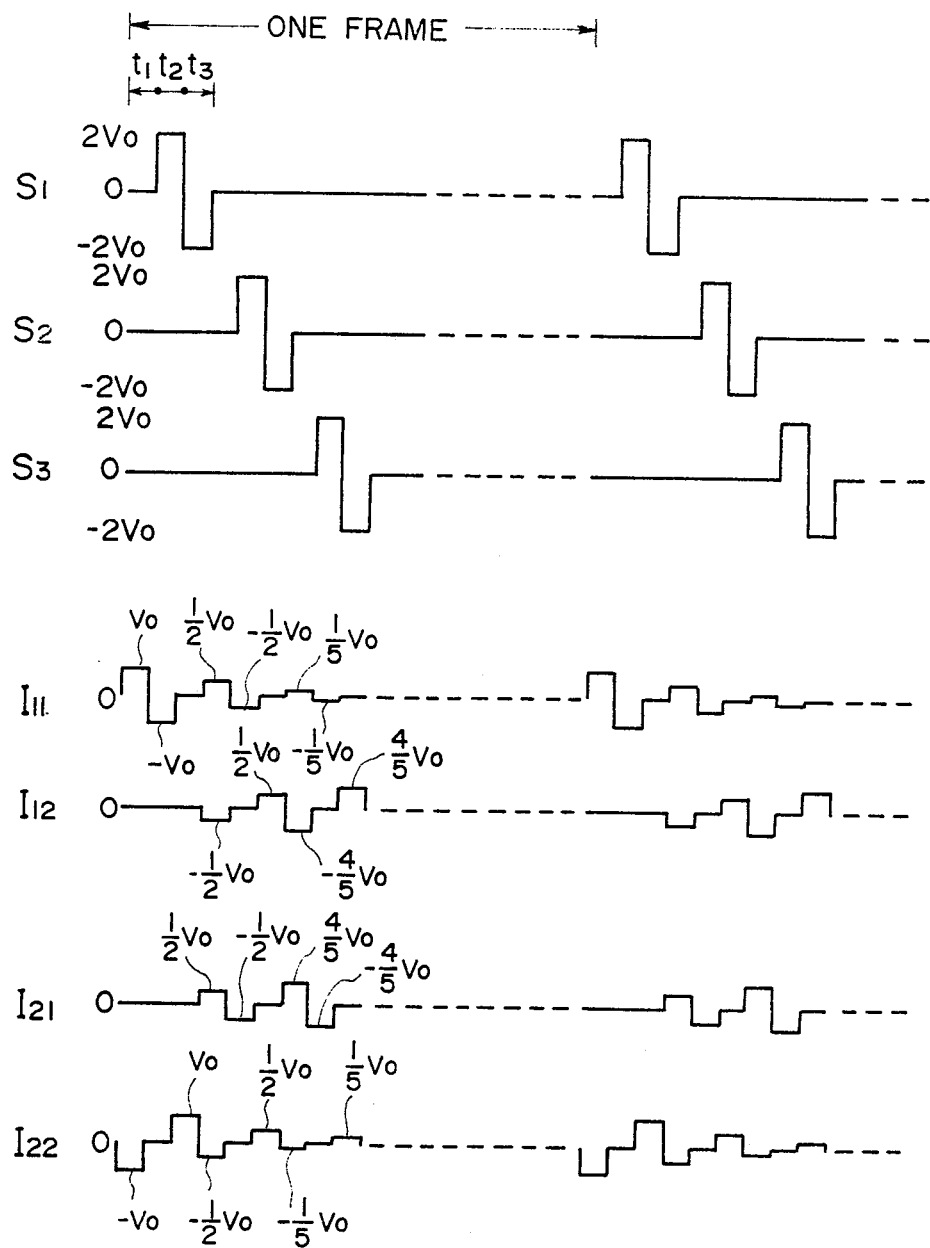
Figure 17:
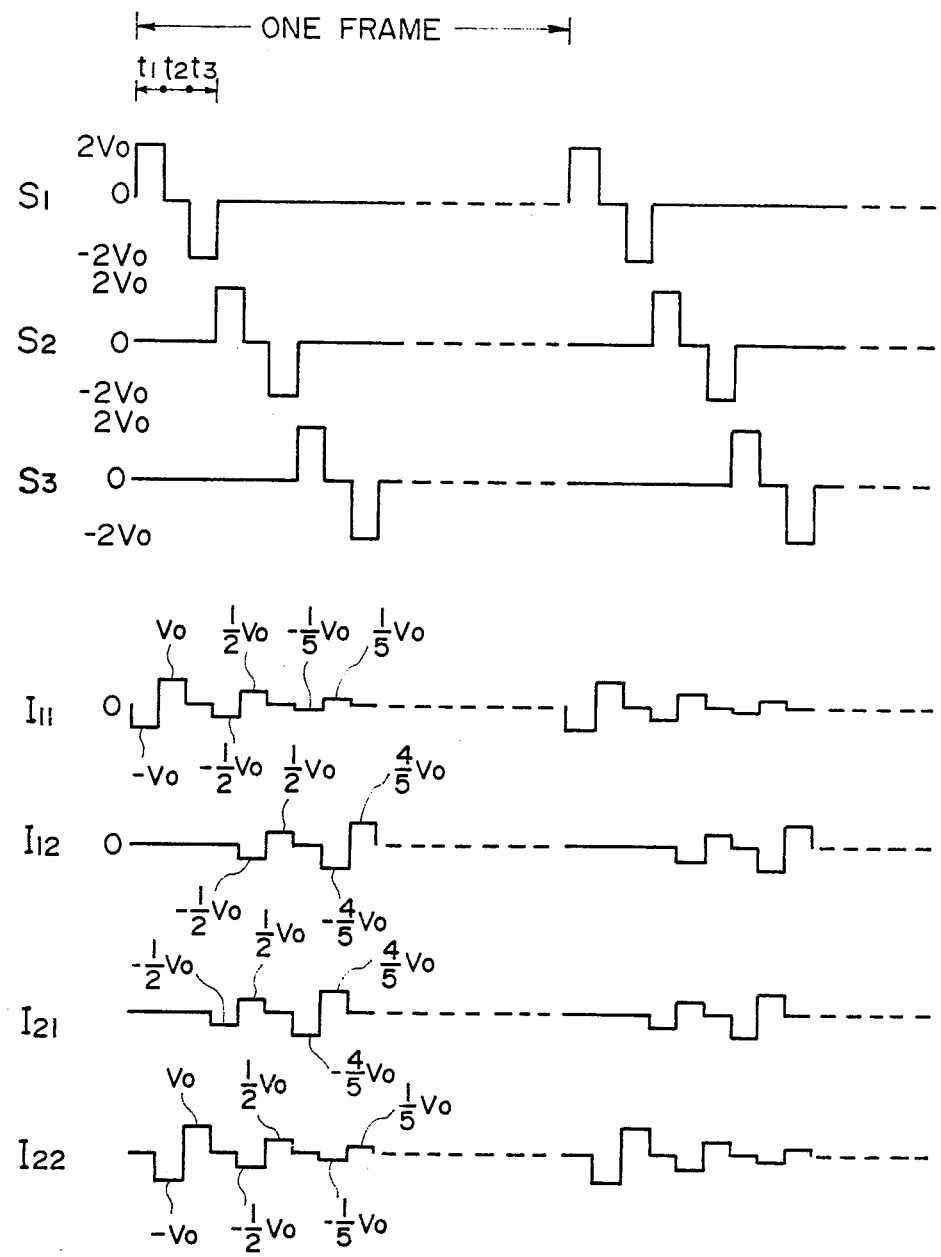

FIGS. 14, 16 and 17 respectively show a modification of the embodiment shown in FIG. 12, wherein a voltage signal for cancelling DC components is applied from the signal electrode side. More specifically, in the embodiment of FIG. 14, phases $t_1$ and $t_2$ are for writing, and a phase $t_3$ is for applying the above-mentioned voltage signal for cancelling DC components. In the embodiment shown in FIG. 16, phase $t_1$ is for applying the voltage signal for cancelling DC components, and phases $t_2$ and $t_3$ are for writing. In the embodiment shown in FIG. 17, phases $t_1$ and $t_3$ are for writing, and phase $t_2$ is for applying the voltage signal for cancelling DC components.

Figure 15:
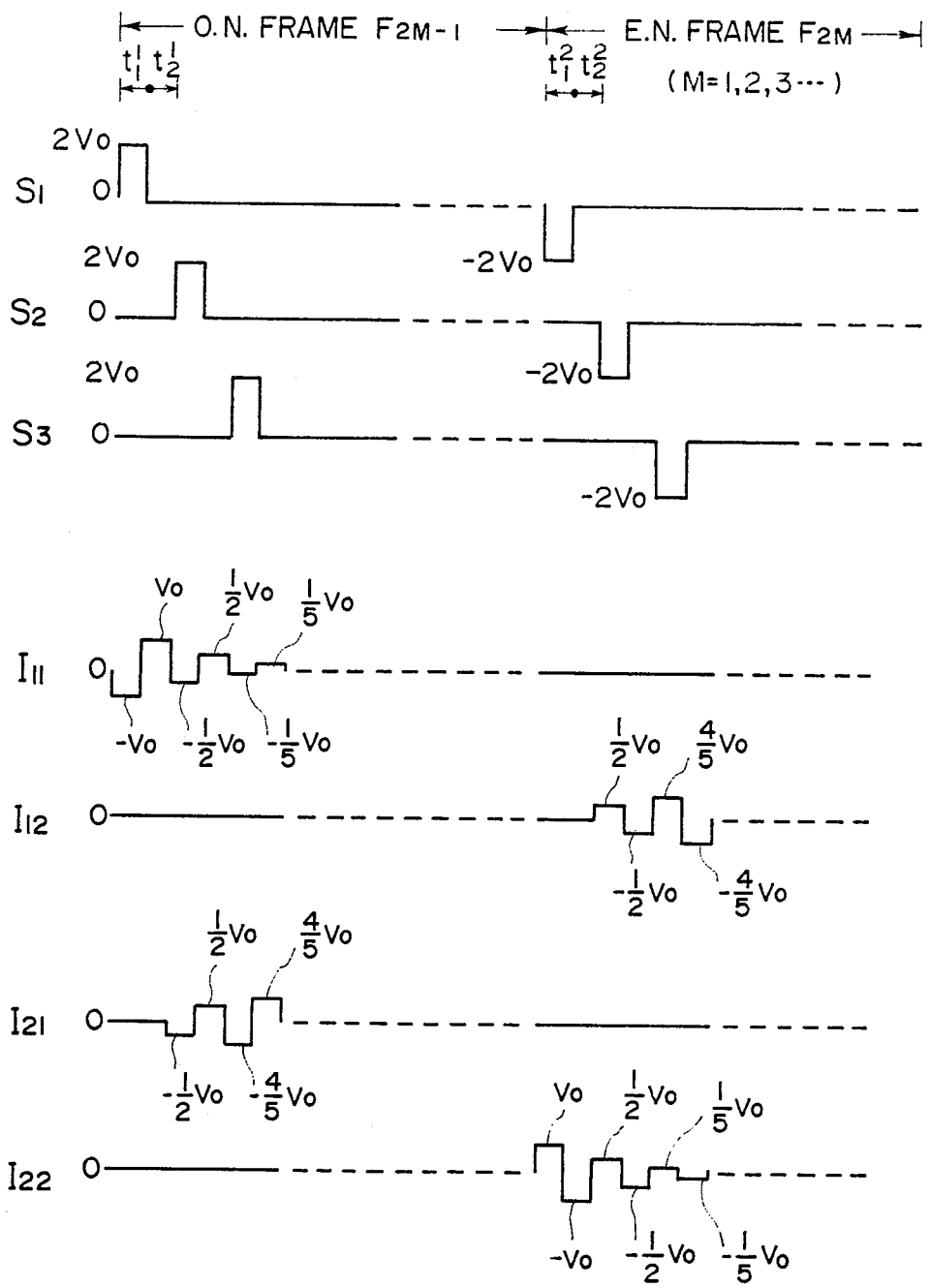

FIG. 15 shows a modification of the embodiment shown in FIG. 13, wherein in an odd-numbered frame $F_{2M-1}$ (M=1, 2, 3, . . . ), a phase $t_1^1$ is for writing "black" and a phase $t_2^1$ is for applying a voltage signal for cancelling DC components, and in an even-numbered frame, a phase $t_1^2$ 2 is for writing "white" and a phase $t_2^2$ is for applying a voltage signal for cancelling DC components.

FIG. 18 is a diagram showing an outline of a driving circuit for driving a liquid crystal display panel according to the system of the present invention. In the figure, a part surrounded by a dashed line corresponds to a display panel 184 wherein a hatched portion corresponds to a pixel providing a gradational display. The panel comprises scanning electrodes 181, signal electrodes 182 and signal electrodes 183. A signal electrode 182 is supplied with a negative voltage and a signal electrode 183 is supplied with a positive voltage.

The operation of the entire circuit shown in FIG. 18 will now be explained. First of all, an analog image signal supplied from an external system is subjected to high speed A/D conversion at a clock pulse frequency on the order of the video rate (about 20 MHz) by means of an A/D converter 185 to obtain data for one line of the panel (i.e., data for one horizontal scanning period). The data are once latched by a latched circuit 186 and held therein until they are supplied to a panel when a corresponding scanning line is turned on. With respect to the latched data, the reverse polarity data relating to the compliment relationship are also provided, and either a positive or negative signal is applied in synchronism with the scanning line side by means of a clock. More specifically, when a scanning line 181 is supplied with a positive signal, a non-inverted signal line 182 is active, and an inverted signal line 183 is inactive and grounded. As a result, a positive potential gradient at 182→183 is developed. On the other hand, when a scanning line 181 is supplied with a negative signal, the non-inverted signal line 182 is inactive and grounded, and the inverted signal line 183 is active. As a result, a negative potential gradient of 182←183 is developed. By repeating the above operation every other frame, a gradational display corresponding to given gradation data may be realized by using an optical modulation device comprising an optical modulation material showing bistability in response to an electric field applied thereto.

Figure 19:
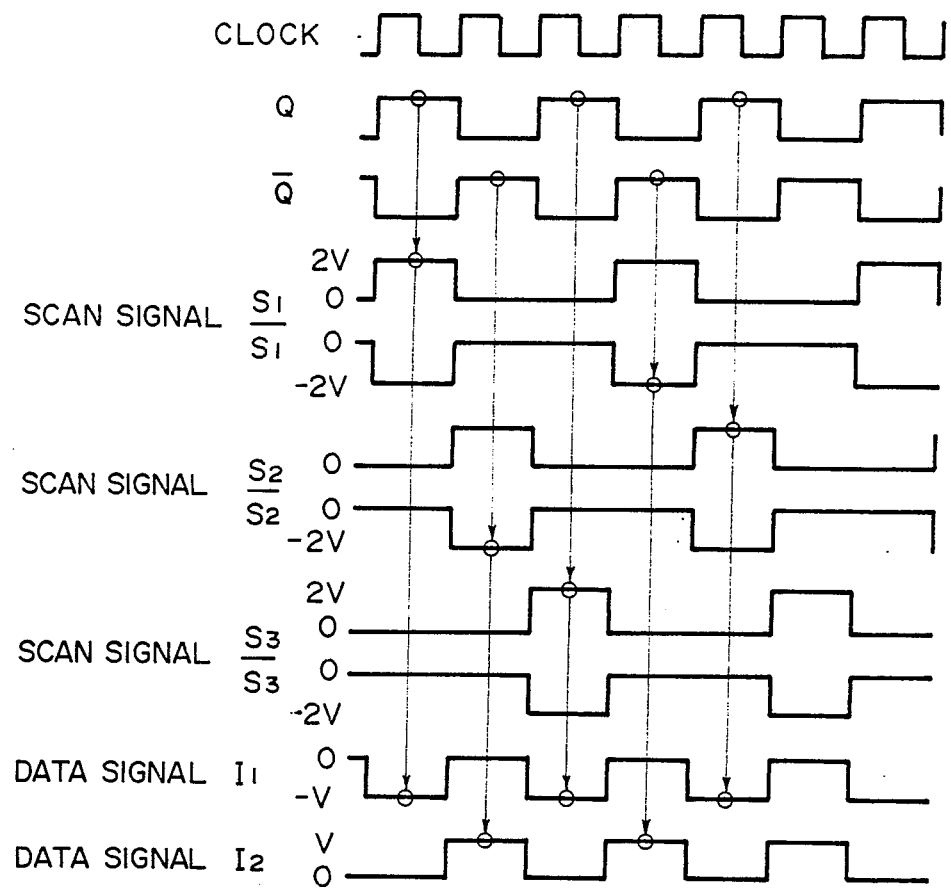
FIG. 19 is a time chart of respective signals for gradational display corresponding to image data.

The above operation will be further explained with reference to a time chart shown in FIG. 19. For better comprehension, the analog subtracter 187 and the inverting amplifier 188 shown in FIG. 18 are explained with reference to examples shown in FIGS. 20A and 20B. FIG. 20A shows a more detailed structure of the inverting amplifier 188 and FIG. 20B shows a more detailed structure of the analog subtracter 187. In the figures, it is assumed that capacitors $C_1$ and $C_2$ both have 22 pF, and $R_1=R_2=R_3=R_4=10$ K$\Omega$.

The inversion/non-inversion circuit shown in FIG. 20A is a basic circuit which can be either an inverting circuit or a non-inverting circuit by turning ON or OFF the FET (field effect transistor) shown in the figure. The resistance values of $R_1$-$R_3$ mentioned above are representative. The subtracter circuit shown in FIG. 20B is also a basic representative one. Particularly, the circuit has functions of obtaining a difference between two inputs $e_{i1}$ and $e_{i2}$ and inverting the difference as will be explained by the following equations, thus achieving the two functions of analog subtraction and polarity inversion required in the present invention:

$$e_0 = -\frac{R_2}{R_1} e_{i1} + \frac{R_4}{R_3} e_{i2},$$

wherein $e_0$: output, $e_{i1}$: input 1, and $e_{i2}$: input 2. When $R_1=R_2=R_3=R_4$, $e_0=-(e_{i1}-e_{i2})$.

Now, the above-mentioned maximum voltage $V_{max}$ is taken as $e_{i1}$, and a particular input voltage $V_{in}$ is taken as $e_{i2}$. The term $(e_{i1}-e_{i2})$ is a result of analog subtraction for obtaining a compliment and the minus (−) sign represents an inversion.

The time chart shown in FIG. 19 will now be explained with reference to the circuit shown in FIG. 18. A 1H-inversion mode wherein the polarity is inverted for each horizontal scanning period (1H), is explained.

Original clock pulses having a frequency corresponding to twice the 1H frequency are subjected to frequency division by means of a flip-flop FF to obtain Q and $\overline{Q}$ of the reverse phase. Either a non-inverted signal or an inverted signal provided for each scanning line is supplied by turning on either an analog switching tansistor for Q or an analog switching transistor for $\overline{Q}$ for each 1H period by using the frequency-divided signal. On the other hand, with respect to a data signal supplied to a signal line, an analog inverter circuit for Q and an analog inverter circuit for $\overline{Q}$ are provided on the signal line side of the panel 184 in FIG. 18, and either one of them is operated to select a normal output and an analog subtraction/polarity inversion output (compliment output) for each 1H period depending on Q or $\overline{Q}$. The above related operation is explained by O (circle) marks and arrow lines. In a first 1H period when a scanning line $S_1$ is selected, Q is "high" and active so that the scanning signal is supplied as it is while, on the signal line side, a signal $I_1$ corresponding to the input image signal is supplied to a signal electrode 182 as it is depending on Q. In the subsequent 1H period, a subsequent scanning line $S_2$ is selected and $\overline{Q}$ is "high" (active) so that a polarity-inverted signal $\overline{S_2}$ is supplied while, on the signal line side, a signal $I_2$ which has been obtained as a polarity-inverted compliment of a signal corresponding to the input image signal is supplied depending on $\overline{Q}$. In the subsequent 1H period, Q is again "high" (active), and in the further subsequent period $\overline{Q}$ is "high" (active) so that the above operations are respectively repeated. While FIG. 19 deals with only three scanning lines, an actual television set has 525 scanning lines and a period therefor (1F: one vertical scanning period) is involved. However, the above-explained operation can be applied similarly. In the 1H-inversion mode, it is basically assumed that one frame includes an odd number of scanning lines. As a result, a voltage polarity applied to each scanning line is inverted for each field operation, so that the DC-component cancelling effect is effectively achieved while a gradational display corresponding to given image signals is effected.

Figure 21:
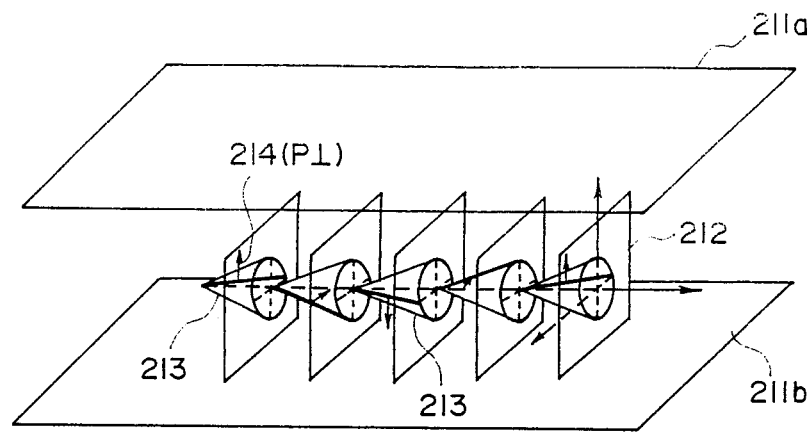
FIGS. 21 and 22 are schematic sectional views respectively illustrating an operation principle of a ferroelectric liquid crystal device used in the present invention.
Figure 22:
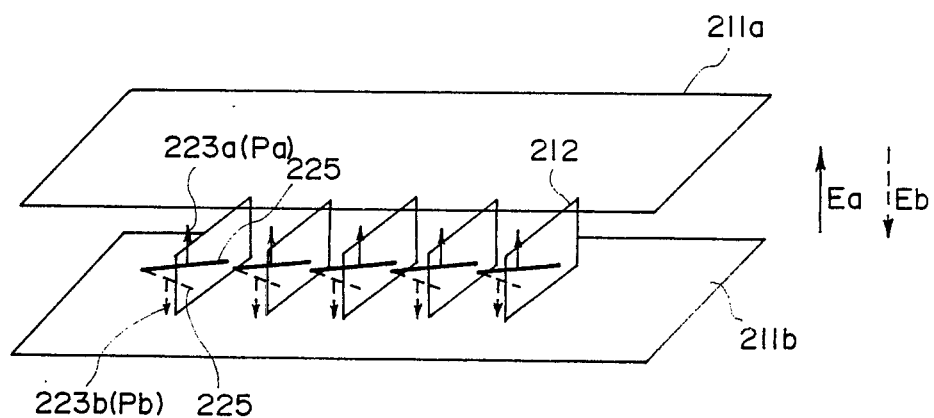

Now, the operation principle of a ferroelectric liquid crystal device is supplemented with reference to schematic sectional views shown in FIGS. 21 and 22.

Referring to FIG. 21, there is schematically shown an example of a ferroelectric liquid crystal cell. Reference numerals 211a and 211b denote substrates (glass plates) on which a transparent electrode of, e.g., $In_2O_3$, $SnO_2$, ITO (indium tin oxide), etc., is disposed, respectively. A liquid crystal of an SmC*-phase in which liquid crystal molecular layers 212 are oriented perpendicular to surfaces of the glass plates is hermetically disposed therebetween. A full line 213 shows liquid crystal molecules. Each liquid crystal molecule 213 has a dipole moment (P⊥) 214 in a direction perpendicular to the axis thereof. When a voltage higher than a certain threshold level is applied between electrodes formed on the substrates 211a and 211b, a helical structure of the liquid crystal molecule 213 is unwound or released to change the alignment direction of respective liquid crystal molecules 213 so that the dipole moments (P⊥) 214 are all directed in the direction of the electric field. The liquid crystal molecules 213 have an elongated shape and show refractive anisotropy between the long axis and the short axis thereof. Accordingly, it is easily understood that when, for instance, polarizers arranged in a cross nicol relationship, i.e., with their polarizing directions being crossing each other, are disposed, on the upper and the lower surfaces of the glass plates, the liquid crystal cell thus arranged functions as a liquid crystal optical modulation device of which optical characteristics such as contrast vary depending upon the polarity of an applied voltage. Further, when the thickness of the liquid crystal cell is sufficiently thin (e.g., 1 micron), the helical structure of the liquid crystal molecules is unwound without application of an electric field whereby the dipole moment assumes either of the two states, i.e., Pa in an upper direction 224a or Pb in a lower direction 224b as shown in FIG. 22. When electric field Ea or Eb higher than a certain threshold level and different from each other in polarity as shown in FIG. 22 is applied to a cell having the above-mentioned characteristics, the dipole moment is directed either in the upper direction 224a or in the lower direction 224b depending on the vector of the electric field Ea or Eb. In correspondence with this, the liquid crystal molecules are oriented to either of a first stable state 223a and a second stable state 223b.

When the above-mentioned ferroelectric liquid crystal is used as an optical modulation device, it is possible to obtain two advantages. First is that the response speed is quite fast. Second is that the orientation of the liquid crystal shows bistability. The second advantage will be further explained, e.g., with reference to FIG. 22. When the electric field Ea is applied to the liquid crystal molecules, they are oriented to the first stable state 223a. This state is stably retained even if the electric field is removed. On the other hand, when the electric field Eb of which direction is opposite to that of the electric field Ea is applied thereto, the liquid crystal molecules are oriented to the second stable state 223b whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell be made as thin as possible.

According to the present invention, there is provided an optical modulation system adapted to gradational display using a display panel having a memory effect, particularly a ferroelectric liquid crystal display panel. When a polarity inversion is effected for each horizontal scanning period or for each vertical scanning period, DC components are effectively cancelled. Particularly, when the polarity inversion is effected for each horizontal scanning period, each pixel or electrode is supplied with an average DC component which can be much smaller than that obtained in a mode wherein the polarity inversion is effected for each frame or vertical scanning period, and high-speed writing can also be accomplished.

What is claimed is:

1. An optical modulation device, comprising:
   a first conductor film electrically connected to first voltage-application means and second voltage application means, and a second conductor film disposed opposite to the first conductor film;
   an optical modulation material disposed between the first and second conductor films; and
   driving means for:
   (a) setting the first voltage-application means at a first reference potential and supplying the second voltage-application means with a first voltage of one polarity relative to the first reference potential to furnish the first conductor film with a first potential gradient;
   (b) supplying the second conductor film with a first voltage of the other polarity relative to the first reference potential in phase with the first voltage of one polarity;
   (c) setting the second voltage-application means at a second reference potential and supplying the first voltage-application means with a second voltage of the other polarity relative to the second reference potential to furnish the first conductor film with a second potential gradient;
   (d) supplying the second conductor film with a second voltage of one polarity relative to the second reference potential in phase with the second voltage of the other polarity; and
   (e) setting the second voltage of one polarity to satisfy a complement relationship with the first voltage of the other polarity or for setting the second voltage of the other polarity to satisfy a complement relationship with the first voltage of one polarity.

2. A device according to claim 1, wherein said first reference potential and said second reference potential are at the same level.

3. A device according to claim 1, wherein said optical modulation material is a liquid crystal.

4. A device according to claim 3, wherein said liquid crystal is a ferroelectric liquid crystal.

5. A device according to claim 4, wherein said ferroelectric liquid crystal is a chiral smectic liquid crystal.

6. A device according to claim 5, wherein said chiral smectic liquid crystal is disposed in a layer thin enough to release its own helical structure in the absence of an electric field.

7. An optical modulation device, comprising:
a panel comprising first conductor films each electrically connected to first voltage-application means and second-voltage application means, second conductor films disposed opposite to and intersecting with the first conductor films so as to form a matrix, and an optical modulation material disposed between the first conductor films and the second conductor films so as to form a pixel at each intersection of the first and second conductor films; and driving means for:

(a) supplying a selected first voltage-application means and a selected second voltage-application means respectively connected to a selected first conductor film with a voltage of one polarity with respect to the voltage level of a nonselected voltage-application means and a same level voltage which is at the same level as the voltage level of the nonselected voltage-application means, respectively, to provide the selected first conductor film with a first potential gradient;

(b) supplying a second conductor film with a voltage of the other polarity with respect to the voltage level of the nonselected voltage-application means in phase with the voltage supply to the selected first and second voltage-application means;

(c) supplying the selected first voltage-application means and the selected second voltage-application means with a same level voltage which is at the same level as the voltage level of a nonselected voltage-application means and a voltage of the other polarity with respect to the voltage level of the nonselected voltage-application means, respectively, to provide the selected conductor film with a second potential gradient;

(d) supplying the second conductor film with a voltage of one polarity with respect to the voltage level of the nonselected voltage-application means in phase with the voltage supply to the selected first and second voltage-application means; and (e) setting the voltage of one polarity supplied to the second conductor film to satisfy a complement relationship with the voltage of the other polarity supplied to the second conductor film.

8. A device according to claim 7, wherein the first and second potential gradients are provided to the selected first conductor film in one horizontal scanning period for selection of a first conductor film including periods of (a) and (c).

9. A device according to claim 7, wherein the first and second potential gradients are provided to the selected first conductor film in the periods of (a) and (c) disposed in different vertical scanning periods each comprising a plurality of horizontal scanning periods for selection of a first conductor film.

10. A device according to claim 7, wherein in addition to the periods of (a) and (c) for provision of the first and second potential gradients, a period for supplying the first and second voltage-application means with the same level of voltages respectively is disposed.

11. A device according to claim 10, wherein said the same level of voltages are at the same level as the voltage level of a nonselected voltage-application means.

12. A device according to claim 10, wherein said period for supplying the first and second voltage-application means with the same level of voltages is disposed between the periods of (a) and (c).

13. A device according to claim 10, wherein said period for supplying the first and second voltage-application means with the same level of voltages is disposed after the period of (c).

14. A device according to claim 10, wherein said period for supplying the first and second voltage-application means with the same level of voltages is disposed before the period of (a).

15. A device according to claim 7, wherein said optical modulation material is a liquid crystal.

16. A device according to claim 15, wherein said liquid crystal is a ferroelectric liquid crystal.

17. A device according to claim 16, wherein said ferroelectric liquid crystal is a chiral smectic liquid crystal.

18. A device according to claim 17, wherein said chiral smectic liquid crystal is disposed in a layer thin enough to release its own helical structure in the absence of an electric field.

19. An optical modulation device, comprising:
a panel comprising first conductor films each electrically connected to first voltage-application means and second voltage-application means, second conductor films disposed opposite to and intersecting with the first conductor films so as to form a matrix, and an optical modulation material disposed between the first conductor films and the second conductor films so as to form a pixel at each.intersection of the first and second conductor films; and driving means for:

(a) supplying a selected second conductor film with a voltage of one polarity and a voltage of the other polarity respectively with respect to the voltage level of a nonselected second conductor film;

(b) in phase with said voltage of one polarity supplied to the selected second conductor film, supplying a first voltage-application means connected to a first conductor film with a voltage of the other polarity with respect to the voltage level of the nonselected second conductor film and supplying a second voltage-appliction means connected to the first conductor film with a voltage at the same level as the voltage level of the nonselected second conductor film;

(c) in phase with said voltage of the other polarity supplied to the selected second conductor film, supplying the first voltage-application means with a voltage at the same level as the voltage level of the nonselected second conductor film and supplying the second voltage-application means with a voltage of one polarity with respect to the voltage level of the nonselected second conductor film; and (d) setting said voltage of one polarity supplied to the second voltage-application means in (c) to satisfy a complement relationship with said voltage of the other polarity supplied to the first voltage-application means in (b).

20. A device according to claim 19, wherein said selected second conductor film is supplied with the voltage of one polarity and the voltage of the other polarity in a single horizontal scanning period for selection of a second conductor film.

21. A device according to claim 19, wherein said selected second conductor film is supplied with the voltage of one polarity and the voltage of the other polarity in different vertical scanning periods each comprising a plurality of horizontal scanning periods.

22. A device according to claim 19, wherein said selected second conductor film is supplied with a same level voltage which is at the same level as the voltage level of a nonselected second conductor film in addition to said voltage of one polarity and said voltage of the other polarity.

23. A device according to claim 22, wherein said same level voltage is supplied between the supply of said voltage of one polarity and the supply of said voltage of the other polarity.

24. A device according to claim 22, wherein said same level voltage is supplied before the supply of said voltage of one polarity.

25. A device according to claim 22, wherein said same level voltage is supplied after the supply of said voltage of the other polarity.

26. A device according to claim 19, wherein said optical modulation material is a liquid crystal.

27. A device according to claim 26, wherein said liquid crystal is a ferroelectric liquid crystal.

28. A device according to claim 27, wherein said ferroelectric liquid crystal is a chiral smectic liquid crystal.

29. A device according to claim 28, wherein said chiral smectic liquid crystal is disposed in a layer thin enough to release its own helical structure in the absence of an electric field.

30. An optical modulation device, comprising:
a panel comprising first conductor films each electrically connected to first voltage-application means and second voltage-application means, second conductor films disposed opposite to and intersecting with the first conductor films so as to form a matrix, and an optical modulation material disposed between the first conductor films and the second conductor films so as to form a pixel at each intersection of the first and second conductor films; and driving means for:
(a) supplying a selected first voltage-application means and a selected second voltage-application means respectively connected to a selected first conductor film with a voltage of one polarity with respect to the voltage level of a nonselected voltage-application means and a same level voltage which is at the same level as the voltage level of the nonselected voltage-application means, respectively, to provide the selected first conductor film with a first potential gradient;
(b) supplying a second conductor film with a voltage of the other polarity with respect to the voltage level of the nonselected voltage-application means in phase with the voltage supply to the selected first and second voltage-application means;
(c) supplying the selected first voltage-application means and the selected second voltage-application means with a same level voltage which is at the same level as the voltage level of a nonselected voltage-application means and a voltage of the other polarity with respect to the voltage level of the nonselected voltage-application means, respectively, to provide the selected conductor film with a second potential gradient;
(d) supplying the second conductor film with a voltage of one polarity with respect to the voltage level of the nonselected voltage-application means in phase with the voltage supply to the selected first and second voltage-application means;
(e) setting the voltage of one polarity supplied to the second conductor film to satisfy a compliment relationship with the voltage of the other polarity supplied to the second conductor film; and
(f) supplying the second conductor film with a voltage signal for cancelling DC components applied to the second conductor film.

31. A device according to claim 30, wherein the sum of said voltage of the other polarity supplied in (b), said voltage of one polarity supplied in (d), and said voltage signal for cancelling DC components supplied in (f) respectively to the second conductor film, is at the same level as the voltage level of the nonselected voltage-application means.

32. A device according to claim 30, wherein the period of (f) for supplying the voltage signal for cancelling DC components is disposed before the period of (a) or the period of (c).

33. A device according to claim 30, wherein the period of (f) for supplying the voltage signal for cancelling DC component is disposed between the periods of (a) and (c).

34. A device according to claim 30, wherein the period of (f) for supplying the voltage signal for cancelling DC components is disposed after the period of (a) or the period of (c).

35. A device according to claim 30, wherein said optical modulation material is a liquid crystal.

36. A device according to claim 35, wherein said liquid crystal is a ferroelectric liquid crystal.

37. A device according to claim 36, wherein said ferroelectric liquid crystal is a chiral smectic liquid crystal.

38. A device according to claim 37, wherein said chiral smectic liquid crystal is disposed in a layer thin enough to release its own helical structure in the absence of an electric field.

39. An optical modulation device, comprising:
a panel comprising first conductor films each electrically connected to first voltage-application means and second voltage-application means, second conductor films disposed opposite to and intersecting with the first conductor films so as to form a matrix, and an optical modulation material disposed between the first conductor films and the second conductor films so as to form a pixel at each intersection of the first and second conductor films; and driving means for:
(a) supplying a selected second conductor film with a voltage of one polarity and a voltage of the other polarity respectively with respect to the voltage level of a nonselected second conductor film;
(b) in phase with said voltage of one polarity supplied to the selected second conductor film, supplying a first voltage-application means connected to a first conductor film with a voltage of the other polarity with respect to the voltage level of the nonselected second conductor film and supplying a second voltage-application means connected to the first conductor film with a same level voltage at the same level as the voltage level of the nonselected second conductor film;
(c) in phase with said voltage of the other polarity supplied to the selected second conductor film, supplying the first voltage-application means with a voltage at the same level as the voltage level of the nonselected second conductor film and supplying the second voltage-application means with a voltage of one polarity with respect to the voltage level of the nonselected second conductor film;

(d) setting said voltage of one polarity supplied to the second voltage-application means in (c) to satisfy a complement relationship with said voltage of the other polarity supplied to the first voltage-application means in (b); and (e) supplying said first and second voltage-application means with voltage signals for cancelling DC components applied to the first and second voltage-application means, respectively.

40. A device according to claim 39, wherein the sum of said same level voltage supplied in (b), said voltage of one polarity supplied in (c) and the voltage signal for cancelling DC components supplied in (e) respectively to the second voltage-application means is at the same level as the voltage level of the nonselected second conductor film.

41. A device according to claim 39, wherein the voltage signal for cancelling DC components is supplied before the supply of said voltage of one polarity or said voltage of the other polarity in (a).

42. A device according to claim 39, wherein the voltage signal for cancelling DC components is supplied between the supply of said voltage of one polarity and the supply of said voltage of the other polarity in (a).

43. A device according to claim 39, wherein the voltage signal for cancelling DC components is supplied after the supply of said voltage of one polarity or said voltage of the other polarity in (a).

44. A device according to claim 39, wherein said optical modulation material is a liquid crystal.

45. A device according to claim 44, wherein said liquid crystal is a ferroelectric liquid crystal.

46. A device according to claim 45, wherein said ferroelectric liquid crystal is a chiral smectic liquid crystal.

47. A device according to claim 46, wherein said chiral smectic liquid crystal is disposed in a layer thin enough to release its own helical structure in the absence of an electric field.

* * * * *

UNITED STATES PATENT AND TRADEMARK OFFICE
CERTIFICATE OF CORRECTION

PATENT NO. : 4,776,676
DATED : October 11, 1988
INVENTOR(S) : HIROSHI INOUE, ET AL.

Page 1 of 4

It is certified that error appears in the above-identified patent and that said Letters Patent is hereby corrected as shown below:

IN [30] FOREIGN APPLICATION PRIORITY DATA

"Aug. 6, 1987 [JP] Japan ........ 61-197826" should read
--Aug. 6, 1987 [JP] Japan ........ 62-197826--.

IN [57] ABSTRACT

Line 2, "includes" should read --includes:--.
Line 23, "compliment" should read --complement--.

COLUMN 1

Line 66, "voltage applica-" should read --voltage-applica- --.

COLUMN 2

Line 11, "voltage application" should read --voltage-application--.
Line 20, "compliment" should read --complement--.
Line 23, "compliment" should read --complement--.

UNITED STATES PATENT AND TRADEMARK OFFICE
CERTIFICATE OF CORRECTION

PATENT NO. : 4,776,676
DATED : October 11, 1988
INVENTOR(S) : HIROSHI INOUE, ET AL.

Page 2 of 4

It is certified that error appears in the above-identified patent and that said Letters Patent is hereby corrected as shown below:

COLUMN 3

Line 19, "represent" should read --represents--.
    Line 47, "compliment" should read --complement--.

COLUMN 4

Line 17, "and" should read --are--.
    Line 27, "compliment" should read --complement--.
    Line 37, "$(V_{max}-V_{12})$" should read --$(V_{max}-V_{12})$.--.
    Line 42, "compliment" should read --complement--.
    Line 60, "compliment" should read --complement--.
    Line 62, "a real" should read --areal--.
    Line 63, "Then," should read --Now,--.

COLUMN 5

Line 35, "compliment" should read --complement--.
    Line 57, "pliment" should read --plement--.

COLUMN 6

Line 6, "compliment" should read --complement--.
    Line 21, "even-numbered frame" should read --even-numbered frame $F_{2M}$,--.

UNITED STATES PATENT AND TRADEMARK OFFICE
CERTIFICATE OF CORRECTION

PATENT NO. : 4,776,676

DATED : October 11, 1988

INVENTOR(S) : HIROSHI INOUE, ET AL.

Page 3 of 4

It is certified that error appears in the above-identified patent and that said Letters Patent is hereby corrected as shown below:

COLUMN 7

Line 23, "bered frame" should read --bered frame $F_{2M}$,--. and "phase $t_1^2$ 2" should read --phase $t_1^2$--.

Line 47, "compliment" should read --complement--.

COLUMN 8

Line 11, "$R_1$-$R_3$" should read --$R_1$-$R_4$--.
Line 28, "compliment" should read --complement--.
Line 39, "tan-" should read --tran- --.
Line 47, "(compliment" should read --(complement--.
Line 60, "compliment" should read --complement--.

COLUMN 10

Line 27, "voltage ap-" should read --voltage-ap- --.

UNITED STATES PATENT AND TRADEMARK OFFICE
CERTIFICATE OF CORRECTION

PATENT NO. : 4,776,676
DATED : October 11, 1988
INVENTOR(S) : HIROSHI INOUE, ET AL.

Page 4 of 4

It is certified that error appears in the above-identified patent and that said Letters Patent is hereby corrected as shown below:

COLUMN 14

Line 4, "compliment" should read --complement--.
Line 23, "DC component" should read --DC components--.

Signed and Sealed this

Seventeenth Day of October, 1989

Attest:

DONALD J. QUIGG

Attesting Officer

Commissioner of Patents and Trademarks